United States Patent
Hoshino et al.

(10) Patent No.: US 11,408,831 B2
(45) Date of Patent: Aug. 9, 2022

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventors: Shoichi Hoshino, Tama (JP); Masakazu Matsugu, Yokohama (JP); Yusuke Mitarai, Tokyo (JP); Atsushi Nogami, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 140 days.

(21) Appl. No.: 16/783,048

(22) Filed: Feb. 5, 2020

(65) Prior Publication Data
US 2020/0264108 A1  Aug. 20, 2020

(30) Foreign Application Priority Data
Feb. 18, 2019 (JP) .............................. JP2019-026581

(51) Int. Cl.
*G06T 7/00* (2017.01)
*G01N 21/88* (2006.01)
*G06F 3/01* (2006.01)

(52) U.S. Cl.
CPC ..... *G01N 21/8851* (2013.01); *G01N 21/8803* (2013.01); *G06F 3/013* (2013.01); *G06T 7/0004* (2013.01); *G01N 2021/888* (2013.01); *G01N 2021/8864* (2013.01); *G06T 2207/30108* (2013.01)

(58) Field of Classification Search
CPC ....... G06T 7/0001; G06T 7/70; G06T 7/0004; G06T 11/00; G07T 7/60; G01N 2021/888; G01N 21/8803; G01N 2021/8864; G01N 21/8851; G06F 3/013; G06F 9/451; G01T 2207/30108; G06K 9/00671; G06K 9/00355; H04L 67/1095; H04L 9/0816; H04W 56/001
See application file for complete search history.

(56) References Cited

U.S. PATENT DOCUMENTS

2011/0074826 A1* 3/2011 Otani ..................... G09G 5/346
345/660

FOREIGN PATENT DOCUMENTS

JP          5281533 B2       9/2013
JP          2014-228357 A    12/2014

* cited by examiner

*Primary Examiner* — Phuoc H Doan
(74) *Attorney, Agent, or Firm* — Canon U.S.A., Inc. IP Division

(57) ABSTRACT

An apparatus according to the present disclosure acquires a display condition for displaying at least a part of target data as a display image on a display unit, determines, in a case where the display image is changed, whether to store the display condition according to a changed display image in a storage unit, based on an index relating to the change of the display image, and stores, in a case where the display condition is determined to be stored, the display condition according to the changed display image in the storage unit.

33 Claims, 14 Drawing Sheets

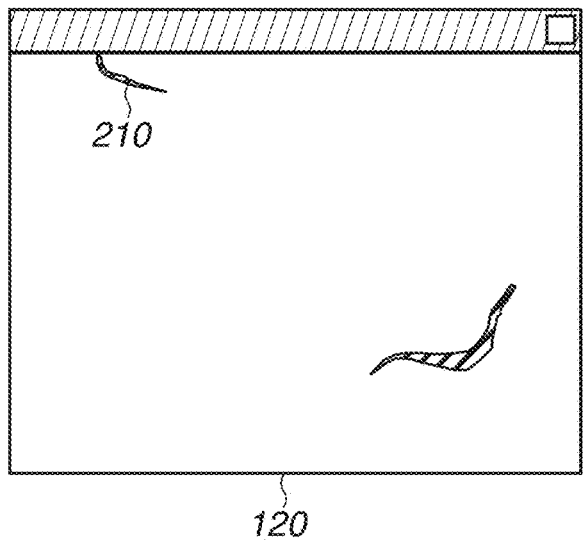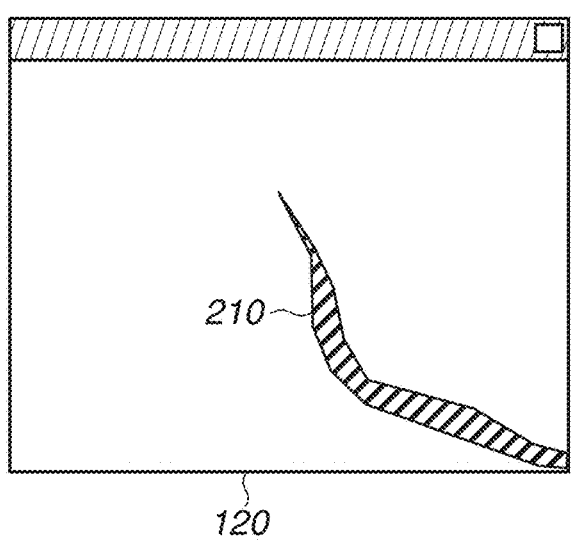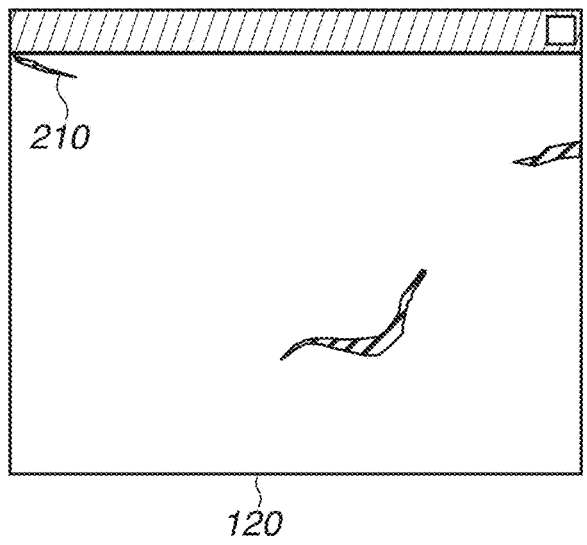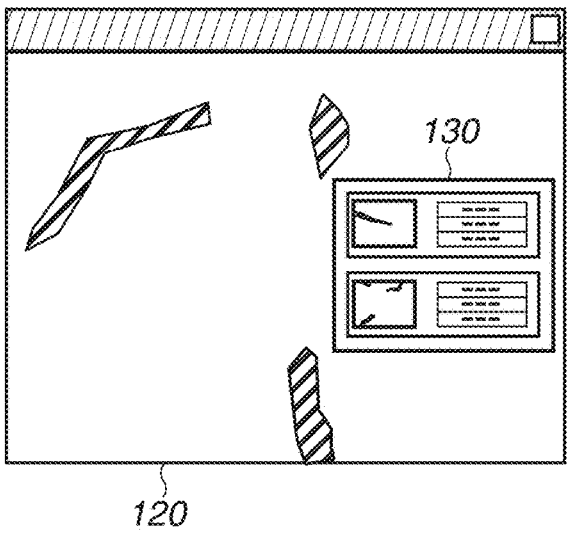

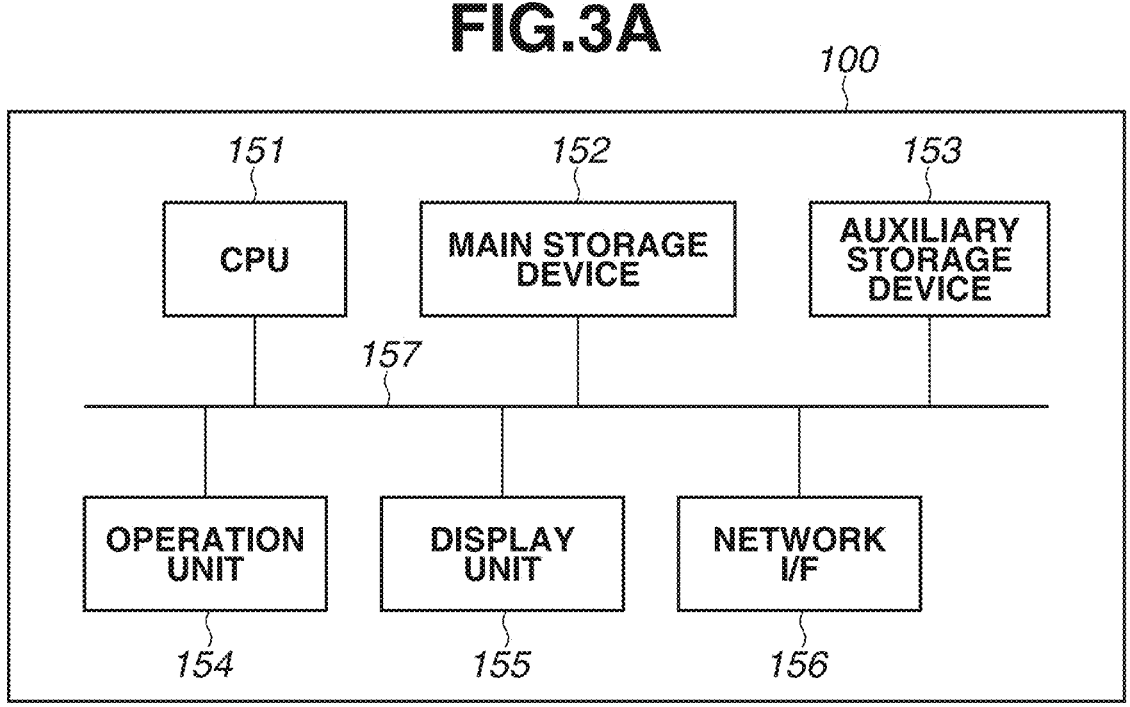
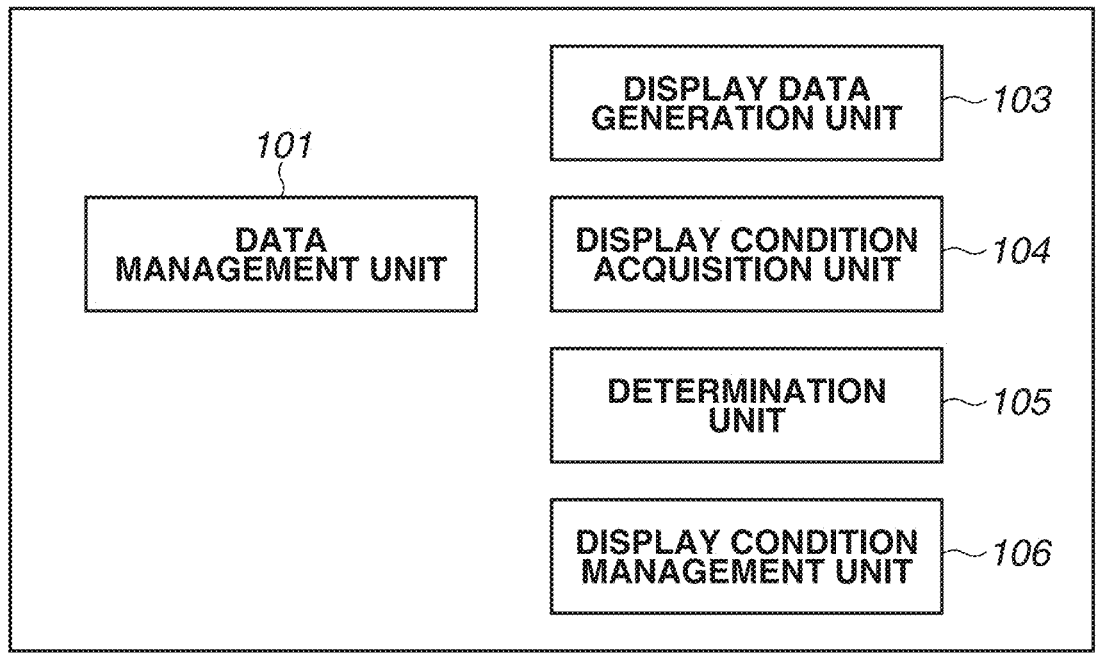

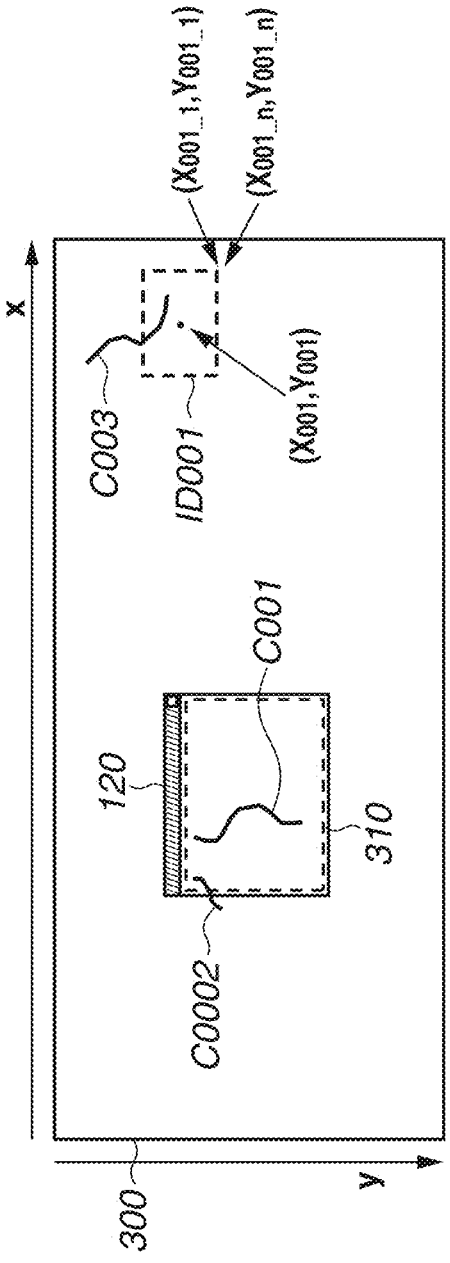

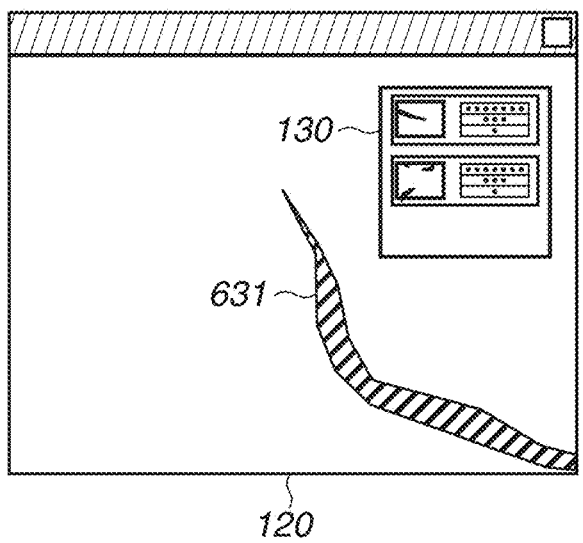 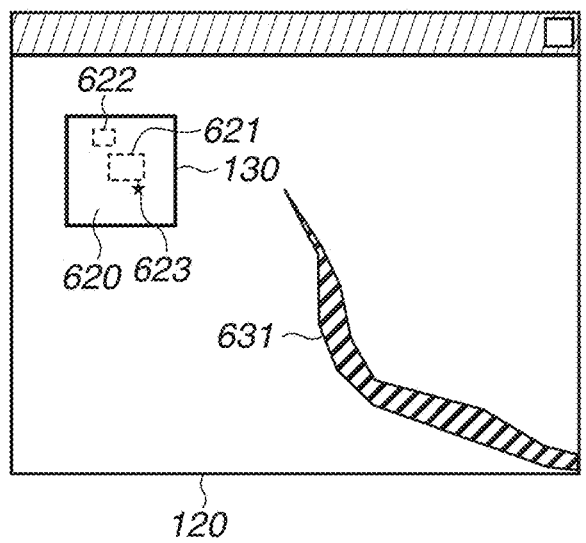

INFORMATION PROCESSING APPARATUS, INFORMATION PROCESSING METHOD, AND RECORDING MEDIUM

BACKGROUND

Field of the Disclosure

The present disclosure relates to an information processing apparatus, an information processing method, and a recording medium.

Description of the Related Art

In an inspection of a wall face of a structural object, such as a bridge and an appearance inspection of components or an outer package of a product, a defect such as a crack is visually checked by an inspection technician. The above-described inspection work called proximity visual inspection requires high operation costs. Therefore, in recent years, there has been provided a method of detecting a defect from a captured image of an inspection target. Japanese Patent Application Laid-Open No. 2014-228357 discusses a crack detection method capable of detecting only an actual crack even in a case where dirt, stain, imaging unevenness, or a formwork mark which is similar to the actual crack exists in an image of a concrete surface.

In the above-described method, there is a case where a false-positive result or a false-negative result is acquired. Therefore, based on the detection result, the image is checked and modified as necessary by a specialist (i.e., user). In the above-described checking and modification operation, the user repeatedly executes operations for enlarging/reducing the image and operation for changing a coordinate in order to precisely view the defect in the image of a detection result. For example, after the user checks one screen which displays an enlarged attention portion in the image, the user may return the one screen to the original screen to continue the viewing operation, or may return the one screen to a screen halfway between the screens to view another defect. However, in order to return one screen to another, the user has to execute troublesome operations, such as an enlargement/reduction operation and a coordinate changing operation, so that time and effort of the user will be required. Therefore, there is provided a technique for reducing time and effort of the user. According to a technique discussed in Japanese Patent No. 5281533, a return destination screen is previously stored based on a user instruction, so that a screen can be returned to the return destination screen instructed by the user.

However, in the conventional technique, the user has to store, based on a user instruction, the information about the screen to which the user would like to return. For example, in the image inspection work for checking various defects unevenly existing on the screen, a screen position or a display magnification to which the user would like to return after checking the defect will be different every time. Therefore, an excessive load is placed on the user because the user has to execute a troublesome operation for storing the information about a return destination screen.

SUMMARY

According to various embodiments of the present disclosure, an information processing apparatus includes a condition acquisition unit configured to acquire a display condition for displaying at least a part of target data as a display image on a display unit, a determination unit configured to, in a case where the display image is changed, determine whether to store the display condition according to a changed display image in a storage unit, based on an index relating to the change of the display image, and a storage control unit configured to, in a case where the determination unit determines to store the display condition, store the display condition according to the changed display image in the storage unit.

Further features of various embodiments will become apparent from the following description of exemplary embodiments with reference to the attached drawings.

BRIEF DESCRIPTION OF THE DRAWINGS

FIGS. 2A, 2B, 2C, and 2D are diagrams schematically illustrating an example of processing executed by the information processing apparatus.

FIGS. 3A and 3B are block diagrams illustrating examples of a hardware configuration of the information processing apparatus.

FIGS. 4A and 4B are diagrams illustrating an example of a display condition and the like.

FIGS. 6A and 6B are diagrams illustrating examples of a display image.

FIGS. 8A and 8B are diagrams illustrating examples of lists before and after updating.

DESCRIPTION OF THE EMBODIMENTS

Hereinafter, an exemplary embodiment will be described in detail with reference to the appended drawings. A configuration described in the below-described exemplary embodiment is a representative example, and the scopes of some embodiments are not limited to the specific configuration.

An information processing apparatus 100 according to a first exemplary embodiment displays an image representing target data on a display unit (e.g., a display unit 155 described below in FIGS. 3A and 3B). The target data is data as a target viewed by a user. In the present exemplary embodiment, the target data is a two-dimensional visible light image (red-green-blue (RGB) image). However, another image, such as a thermal image captured by an infrared camera or an image captured by a line sensor camera, can be given as another example of the target data.

Further, hereinafter, because the target data is an image, the target data may be called as a target image.

Further, in the present exemplary embodiment, a "display image" refers to an image which is actually displayed on the display unit 155 when the information processing apparatus 100 displays the target image on the display unit 155. In other words, the display image is an image including all or a part of the target image. Further, hereinafter, an "attention area" refers to an area from among the target image, which appears in the display image. For example, in the present exemplary embodiment, image data (i.e., a photograph in which a concrete structural object is imaged, an image generated based on the photograph, and an image illustrating a crack detected from the image), which is viewed for the purpose of inspecting a defect, such as a crack generated on a wall face of a concrete structural object, is regarded as the target data. The user can enlarge and display, or move (scroll) the above-described image data to inspect the attention area or to provide an instruction for mending a crack. However, the present exemplary embodiment is also applicable to a purpose other than the inspection of defects. For example, the present exemplary embodiment can be used for counting the number of predetermined target objects appearing in an image.

Further, hereinafter, a condition for displaying a target image on the display unit 155 is called as a "display condition". The display condition includes coordinate information for specifying the attention area, a central coordinate of the attention area, an inclination angle of the image, and a display magnification of the image. The display condition includes any type of condition that is used when the image is displayed.

First, an overview of processing according to the present exemplary embodiment will be described with reference to FIGS. 1A, 1B, 1C, and 1D, and FIGS. 2A, 2B, 2C, and 2D.

Figure 1A:
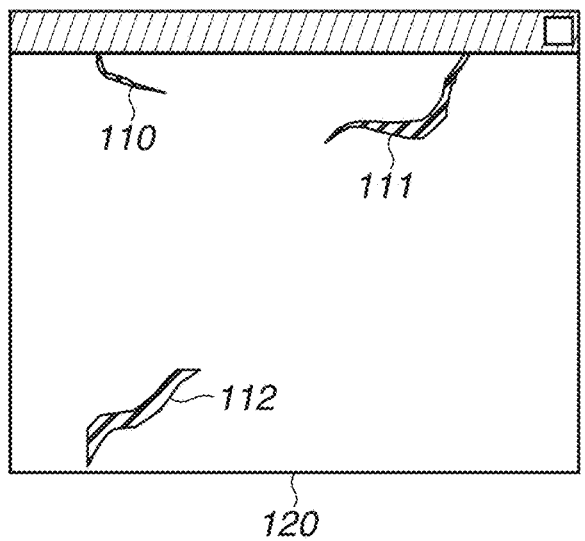
FIGS. 1A, 1B, IC, and ID are diagrams schematically illustrating an example of processing executed by an information processing apparatus.

FIG. 1A is a diagram illustrating a state where a part of the target data is displayed in a window 120 displayed on the display unit 155. The window 120 is used for displaying a display image, i.e., an image of an attention area. In the example in FIG. 1A, defects 110 to 112, such as flaws, degradation, damage, and the other defects, are displayed in the window 120. The user (e.g., a person who checks data or is in charge of the inspection) views the window 120 to check whether there is any defect, such as a crack. In order to check the state of the defect in detail, as illustrated in FIG. 1B, for example, the user enlarges and displays a portion of the defect 110 or displays a peripheral portion thereof.

Figure 1B:
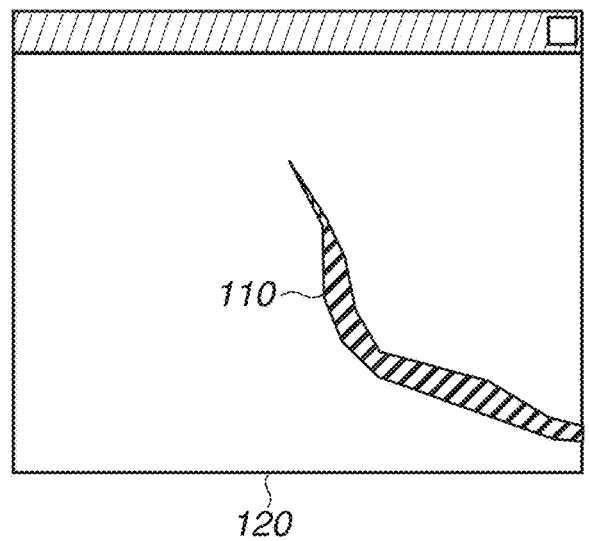

In the example illustrated in FIGS. 1A, 1B, IC, and ID, the user checks the state through the window 120 in FIG. 1B. Then, after checking the defect 110 in detail, the user returns the screen to a display state illustrated in FIG. 1A to continuously check the target data.

Figure 1C:
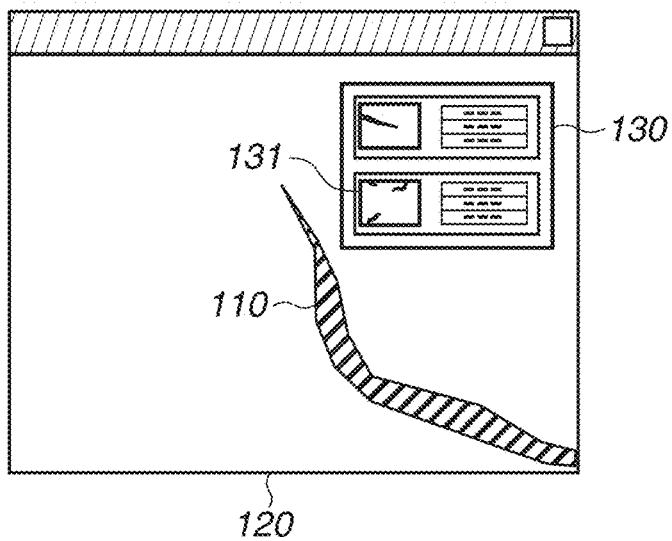

Herein, in order to allow the user to return the display state with a little time and effort, the information processing apparatus 100 executes the following processing. As illustrated in FIG. 1C, the information processing apparatus 100 displays a list 130 as an object that includes a list of objects used for returning the display state, and allows the user to return the screen to a display state according to the object selected from the list 130. In the state illustrated in FIG. 1C, when the user selects an object according to a return destination from the list 130 (i.e., an object 131 as a button object in the example of FIG. 1C), the information processing apparatus 100 returns the screen to a display state according to the selected object.

It is preferable that information which helps the user to determine a display state to which the user would like to return be included in the list 130. For example, as illustrated in FIG. 1D, it is preferable that the information processing apparatus 100 display the information, such as a screen thumbnail illustrating a display state of a return destination, a position coordinate, a display magnification, and a display angle of each of the objects, together with the objects in the list 130.

Figure 1D:
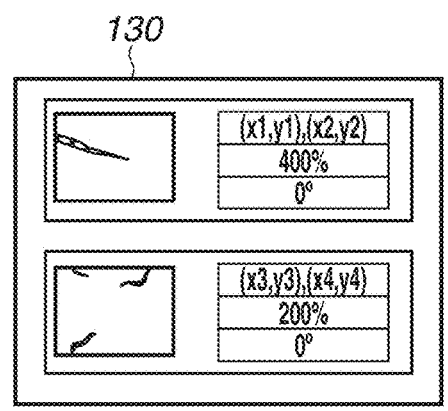

However, in order to display the objects corresponding to a plurality of return destinations in the list 130 as illustrated in FIG. 1D, information about a display condition corresponding to a display state to which the user would like to return has to be stored in advance. Therefore, in the present exemplary embodiment, the information processing apparatus 100 acquires an index used for determining whether to store the display condition of target data, determines whether to store the display condition based on the acquired index, and executes storing processing when the display condition is determined to be stored. With this processing, the information processing apparatus 100 can store the information used for returning the display state of the target data without taking time and effort of the user. Hereinafter, an index used for determining whether to store the display condition is called as a determination index.

FIGS. 2A, 2B, 2C, and 2D are diagrams illustrating a state where a part of target data is displayed in the window 120.

In the present exemplary embodiment, the information processing apparatus 100 acquires the determination index based on a variation in display contents (contents) of the target data displayed on the display unit 155. Hereinafter, an index indicating the variation in the display contents of the target data is called as a content variation. An index described below in FIGS. 7A to 7D can be given as an example of the content variation.

A variation in display contents of the target data will be described. The variation in display contents refers to an index indicating a degree of variations between a display image which the user currently regards as a target and a display image in which the target data is displayed based on a display condition that has been stored in the past.

A display image in FIG. 2A illustrates a display image of target data displayed based on the display condition that has been stored in the past. A defect pattern including a defect 210 is displayed thereon. A display image in FIG. 2B illustrates a display image displayed in the window 120 which the user currently regards as a target. In comparison to the display image in FIG. 2A, the defect 210 is displayed in an enlarged state. As described above, when a variation in display contents of the window 120 is a reference variation or greater, the information processing apparatus 100 stores the display condition of the display image displayed in the window 120 which the user currently regards as a target. On the other hand, when a variation in display contents is smaller than the reference variation, the information processing apparatus 100 does not store the display condition of the display image displayed in the window 120 which the user currently regards as a target.

A display image in FIG. 2C illustrates an image of an area in the target data which is away from the area in the display image of FIG. 2A by a certain distance in a right direction. It is assumed that the variation in the display image in FIG. 2C with respect to the display image FIG. 2A is smaller than the reference variation. In this case, the information processing apparatus 100 does not store the display condition of the display image in FIG. 2C.

The information processing apparatus 100 superimposes the list 130 on the display image displayed in the window 120. The list 130 includes objects used for providing an instruction for returning to a display state based on the past display condition. In FIG. 2D, the list 130 which includes objects used for providing an instruction for returning to the display state based on the display condition that has been stored in the past is displayed. The information processing apparatus 100 stores display conditions, and displays in the list 130 the predetermined number of latest objects corresponding to display conditions.

FIG. 3A is a block diagram illustrating an example of a hardware configuration of the information processing apparatus 100. In the present exemplary embodiment, the information processing apparatus 100 is a personal computer (PC). However, another information processing apparatus, such as a server apparatus, a tablet apparatus, or an embedded computer, can be given as another example of the information processing apparatus 100.

The information processing apparatus 100 includes a central processing unit (CPU) 151, a main storage device 152, an auxiliary storage device 153, an operation unit 154, a display unit 155, and a network interface (I/F) 156. Each of the elements is communicably connected to each other via a system bus 157.

The CPU 151 is a central processing unit which controls the information processing apparatus 100. The main storage device 152 is a storage device, such as a random access memory (RAM) functioning as a work area of the CPU 151 or a temporary storage area of data. The auxiliary storage device 153 is a storage device for storing various programs, various types of setting information, various display conditions, and target data. For example, the auxiliary storage device 153 is a read only memory (ROM), a hard disk drive (HDD), or a solid state drive (SSD). Each of the main storage device 152 and the auxiliary storage device 153 is an example of a storage unit.

The operation unit 154 is an input device such, as a mouse, a keyboard, a touchpad, a touch-panel, or a pen-tablet, which is used for inputting information to the information processing apparatus 100. The display unit 155 is a display device, such as a monitor, a display, or a display portion of a touch-panel. The network I/F 156 is an interface used for executing communication with an external apparatus via a network.

Figure 5:
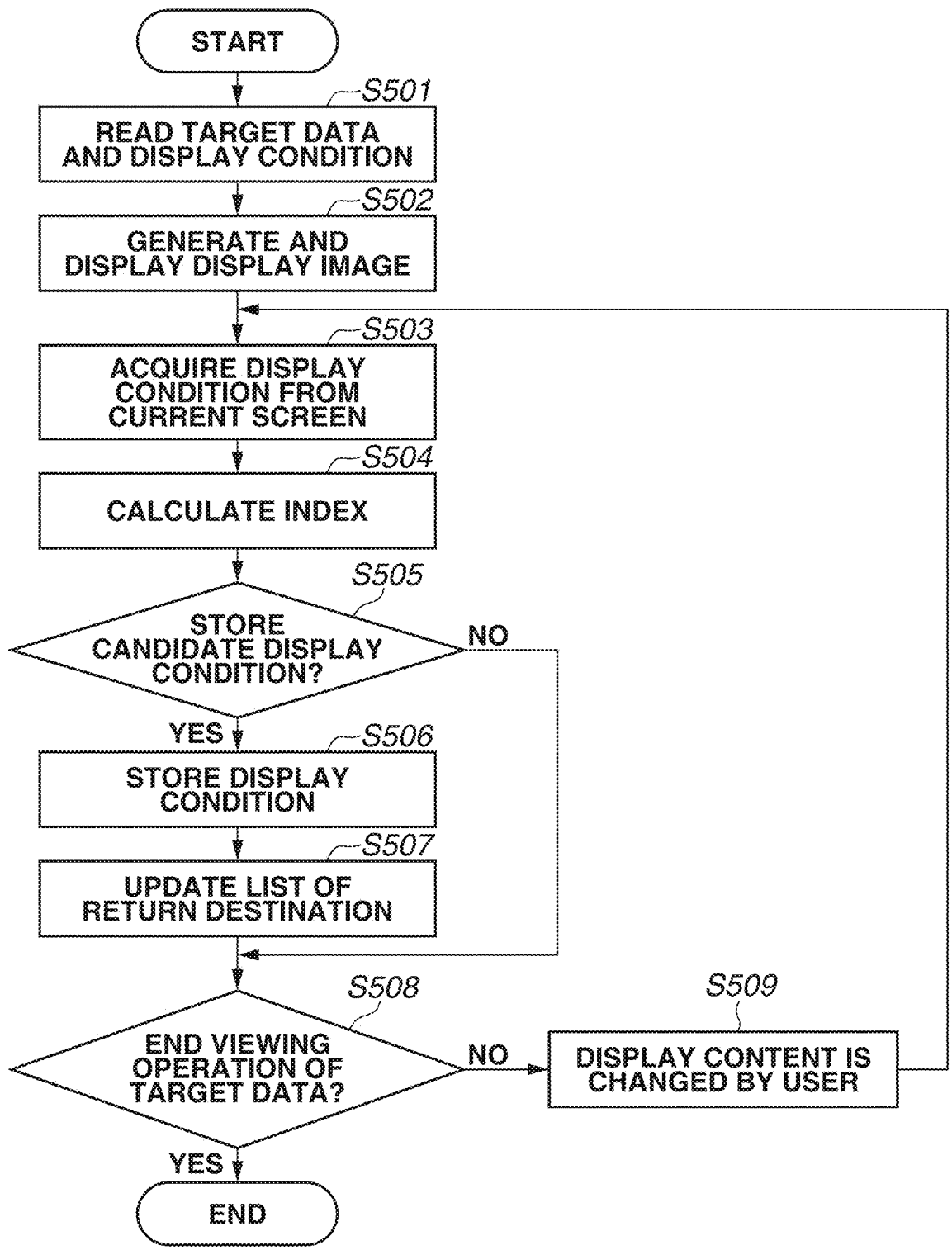
FIG. 5 is a flowchart illustrating an example of processing executed by the information processing apparatus.
Figure 10:
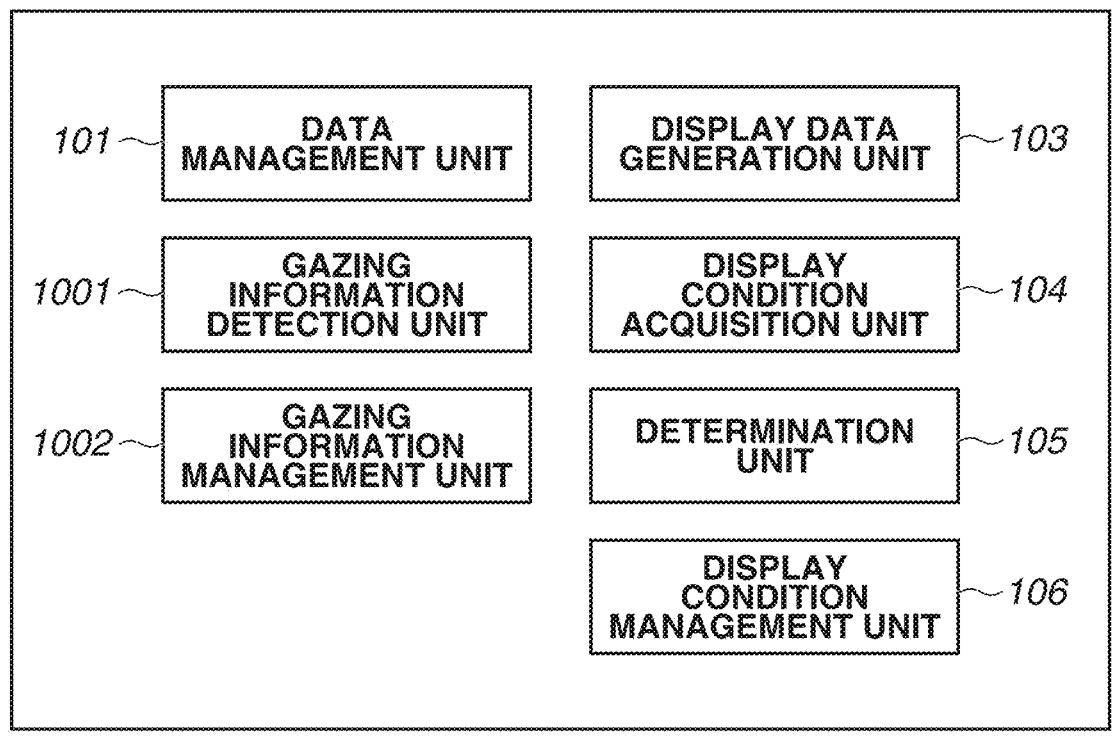
FIG. 10 is a block diagram illustrating an example of a functional configuration of the information processing apparatus.
Figure 11:
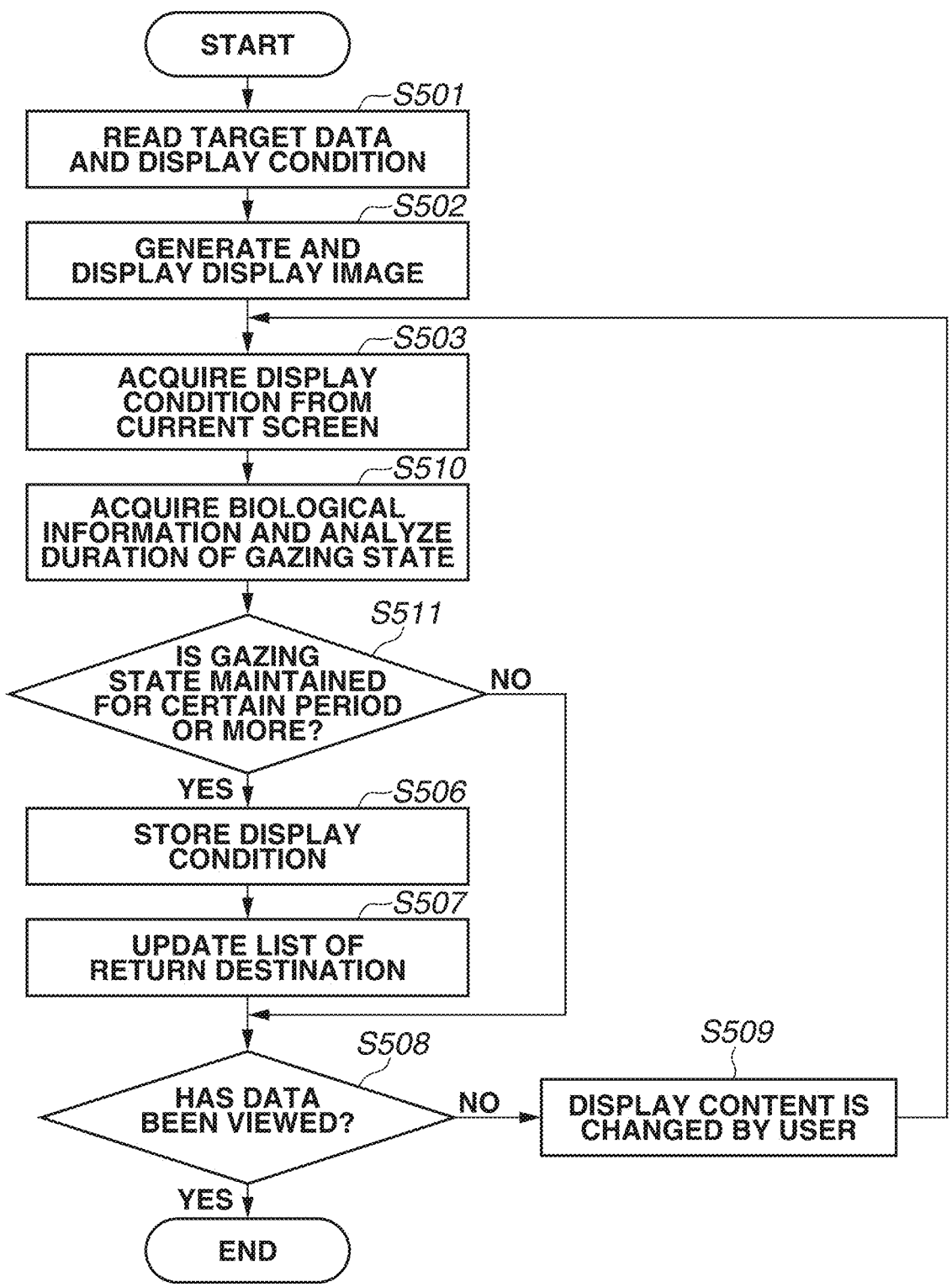
FIG. 11 is a flowchart illustrating an example of processing executed by the information processing apparatus.

The CPU 151 executes processing according to a program stored in the auxiliary storage device 153, so that the below-described functions in FIGS. 3B and 10 and processing of the below-described flowcharts in FIGS. 5 and 11 are realized.

In the present exemplary embodiment, the operation unit 154 and the display unit 155 are separate constituent elements. However, as another example, the operation unit 154 and the display unit 155 may be a single constituent element, such as a touch-panel or a tablet, which includes functions of both of the input device and the display device.

FIG. 3B is a block diagram illustrating an example of a functional configuration of the information processing apparatus 100. The information processing apparatus 100 includes a data management unit 101, a display data generation unit 103, a display condition acquisition unit 104, a determination unit 105, and a display condition management unit 106.

The data management unit 101 manages target data stored in the auxiliary storage device 153. The display data generation unit 103 generates a display image displayed on the display unit 155. The display condition acquisition unit 104 sets a specified display condition or acquires a display condition of a display image displayed on the display unit 155. The determination unit 105 determines whether to store the display condition acquired by the display condition acquisition unit 104. The display condition management unit 106 stores the display condition determined to be stored by the determination unit 105 in the auxiliary storage device 153 and manages the stored display condition.

FIG. 4A is an example of a table used for managing the display condition. Hereinafter, the table used for managing the display condition is called as a management table. The management table is stored in the auxiliary storage device 153. The management table includes information about a predetermined display condition. In the present exemplary embodiment, the management table includes respective pieces of information about an attention area coordinate, a central coordinate, a display magnification, and an angle. In the present exemplary embodiment, an identification (ID) for identifying a display condition, a condition included in the display condition, and a stored date/time of the display condition are stored in the management table. Further, information about storing order of display conditions can be also stored in the management table.

In the example illustrated in FIG. 4A, the attention area is indicated by attention area coordinates of a display condition having an identification "ID001". An area surrounded by n-points of attention area coordinates $(X_{001\_1}, Y_{001\_1})$ to $(X_{001\_n}, Y_{001\_n})$ is a corresponding attention area. The central coordinates represent coordinates at the center of the attention area in the target data. The display magnification represents a display magnification at which a display image of the attention area is displayed. The angle represents an inclination at which the display image of the attention area is displayed. The date/time information represents information about date/time when the display condition is stored.

FIG. 4B is a diagram illustrating an example of a state where the display image is displayed on the display unit 155. An image 300 is a captured image of a detection target object (e.g., an image consisting of 100,000×100,000 pixels or more). The image 300 is regarded as the target data in the present exemplary embodiment. An image coordinate system defined by an x-axis and a y-axis is set to the image 300. Defects C001 to C003 exist in the image 300. The information processing apparatus 100 displays an enlarged image of a part of the image 300 as a display image in the window 120 in order to check details of the defect included in the image 300.

In the example of FIG. 4B, an area 310 indicated by a dotted line is the attention area, i.e., an area displayed in the window 120. An attention area corresponding to the display condition ID001 is illustrated in FIG. 4B. The information processing apparatus 100 specifies an area in the target data which is specified by the coordinates of the attention area coordinates included in the display condition, as the attention area and displays a window illustrating an image of the attention area on the display unit 155.

An example of processing executed by the information processing apparatus 100 of the present exemplary embodiment will be described with reference to FIG. 5.

In S501, the display data generation unit 103 reads and acquires target data and a predetermined display condition from the auxiliary storage device 153.

In S502, the display data generation unit 103 displays an image of a predetermined area (in the present exemplary embodiment, an area of an upper left portion having a predetermined size) in the target data acquired in S501 on the display unit 155 as a display image. Further, based on the display condition acquired in S501, the display data generation unit 103 generates a list 130 as a list of objects used for providing an instruction for returning to a display state corresponding to a display condition, and displays the list 130 on the display unit 155. When the display data generation unit 103 detects selection of the object included in the list 130, the display data generation unit 103 displays the target data on the display unit 155 based on the display condition corresponding to the selected object.

FIGS. 6A and 6B are diagrams illustrating examples of display images displayed in the window 120 through the processing in S502. In the example in FIG. 6A, as the information which allows the user to easily determine a display state to which the user would like to return, the display data generation unit 103 displays a thumbnail and information about a display condition of a display image displayed based on the corresponding display condition on the list 130.

The display data generation unit 103 arranges the objects included in the list 130 in the order of the latest date/time when corresponding display condition is stored. However, as another example, the display data generation unit 103 may arrange the objects included in the list 130 in the order of the shortest distance between the area of the target data displayed based on the corresponding display condition and the area displayed in the window 120.

In the example of FIG. 6B, the display data generation unit 103 displays an overhead image 620 of the entire target data and objects 621 and 622 corresponding to the display condition of the display state as a candidate of a return destination, on the list 130. Each of the objects 621 and 622 is a frame shaped object indicating the corresponding attention area in the target data. For example, when selection of the object 621 made by the operation of the operation unit 154 is detected, the display data generation unit 103 displays the target data based on the display condition corresponding to the object 621. Through the above-described processing, an image of the area in the target data indicated by the object 621 is displayed on the display unit 155 as the display image.

The information processing apparatus 100 displays the overhead image 620 of the target data in the list 130, so that the user can easily understand a positional relationship between the entirety of the target data and the area displayed in the display state of the return destination. Further, as illustrated in FIG. 6B, the display data generation unit 103 may display an object 623 indicating a position corresponding to the display image displayed in the window 120 at the time of processing on the overhead image 620 in the list 130. With this configuration, the user can understand a distance relationship between the current attention area and the attention area of the return destination candidate more easily.

The present exemplary embodiment will be described by returning to FIG. 5.

In S503, the display condition acquisition unit 104 acquires the display condition of the display image displayed on the display unit 155 as the display condition corresponding to that display image.

More specifically, as the display condition, the display condition acquisition unit 104 acquires information about the attention area coordinate, the central coordinate, the display magnification, and the angle of the display image displayed on the display unit 155. The processing in S503 is an example of condition acquisition processing.

In S504, the determination unit 105 acquires a determination index based on the content variation of the display image displayed in the window 120. In other words, the determination unit 105 acquires a determination index based on two display images displayed based on two different display conditions.

More specifically, the determination unit 105 calculates the content variation by using the two display conditions. The first display condition is a display condition acquired in S503 regarded as a target which the determination unit 105 determines whether to store. The second display condition is the display condition selected from display conditions which have been stored in the auxiliary storage device 153 in the past. Hereinafter, the display condition acquired in S503 is called as a candidate display condition. Further, hereinafter, a display condition selected from display conditions that have been stored in the auxiliary storage device 153 in the past is called as a stored display condition. The determination unit 105 selects one or more display conditions from among the display conditions stored in the auxiliary storage device 153 as the stored display conditions. In the present exemplary embodiment, the determination unit 105 selects one or more display conditions previously determined from among the display conditions stored in the auxiliary storage device 153 as the stored display conditions. However, as another example, the determination unit 105 may select one or more display conditions randomly selected from among the display conditions stored in the auxiliary storage device 153 as the stored display conditions.

Examples of the content variation will be described with reference to FIGS. 7A, 7B, 7C, and 7D.

Figure 7A:
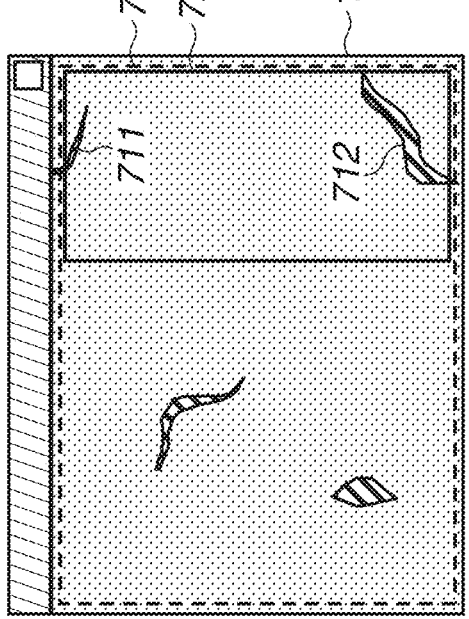
FIGS. 7A, 7B, 7C, and 7D are diagrams illustrating examples of a content variation.
Figure 7B:
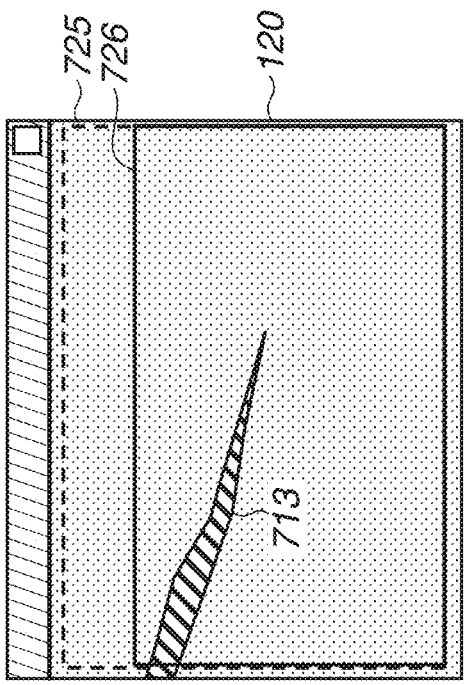

FIG. 7A is a diagram illustrating a state where the display image is displayed in the window 120 based on the stored display condition. In FIG. 7A, the attention area is an area 721 indicated by a dotted line, and defects 711 and 712 exist in the area 721. Here, in order to change the display contents, a display position in the target data is moved in parallel. FIG. 7B is a diagram illustrating an example of the state where the display position is moved to the left from the state illustrated in FIG. 7A.

When the display image in the window 120 is changed to the display image illustrated in FIG. 7B, the attention area in FIG. 7B is an area 722 indicated by a dotted line, and a display condition acquired from the display image in FIG. 7B is the candidate display condition. At this time, an area overlapping between the area 721 and the area 722 is represented by an area 723 surrounded by a solid line.

The content variation is expressed as "C". In the present exemplary embodiment, the content variation C is an index defined by the following formulas 1 and 2.

$$C = \frac{S \vee S_1}{S \wedge S_1} \quad (S \wedge S_1 \neq 0) \qquad \text{Formula 1}$$

$$C = \alpha \quad (S \wedge S_1 = 0) \qquad \text{Formula 2}$$

A symbol $S_1$ in the formula 1 represents the attention area in the display image displayed in the window 120 based on the stored display condition, i.e., the area 721 in the examples in FIGS. 7A and 7B. Further, a symbol S represents the attention area in the display image displayed in the window 120 based on the candidate display condition, i.e., the area 722 in the examples in FIGS. 7A and 7B. A size of the area overlapping between the attention areas $S_1$ and S is expressed as "$S^{\wedge}S_1$". In the examples in FIGS. 7A, 7B, 7C, and 7D, "$S^{\wedge}S_1$" represents a size of the area 723. In the example illustrated in FIGS. 7A, 7B, 7C, and 7D, a value of the content variation C is increased when the area 723 is smaller. In other words, the content variation C is an index that becomes greater when a portion overlapping between the display image corresponding to the candidate display condition and the display image corresponding to the stored display condition is smaller. If the attention areas S and $S_1$ do not overlap with each other, the content variation C is a constant number α as illustrated in the formula 2. Here, the constant number α in the formula 2 is an optional constant number greater than a predetermined threshold value.

By using the index defined by the formulas 1 and 2 as the content variation C, the information processing apparatus 100 can store the display condition for displaying the attention area considerably different from the attention area corresponding to the stored display condition.

In the present exemplary embodiment, the content variation C is described as an index defined by the formulas 1 and 2. However, as another example, the content variation C may be an index different from the index defined by the formulas 1 and 2. Hereinafter, with reference to FIGS. 7C and 7D, the present exemplary embodiment will be described with respect to the case where the content variation is an index different from the index defined by the formulas 1 and 2. More specifically, the present exemplary embodiment will be described with respect to the case where the content variation C is an index defined based on a degree of change in a display size of a predetermined attention area when the display image is enlarged.

Figure 7C:
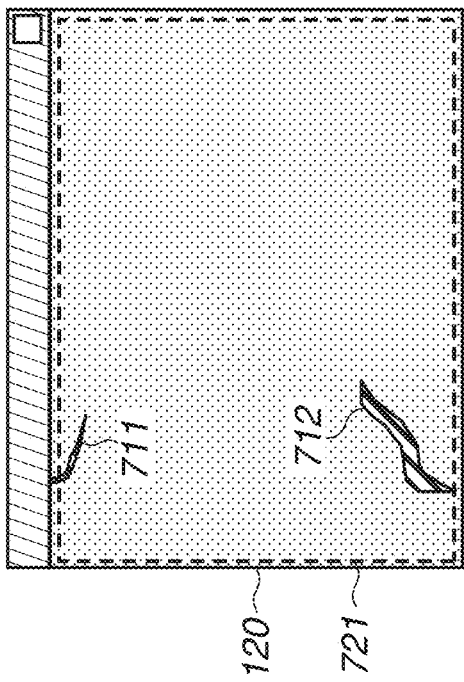
Figure 7D:
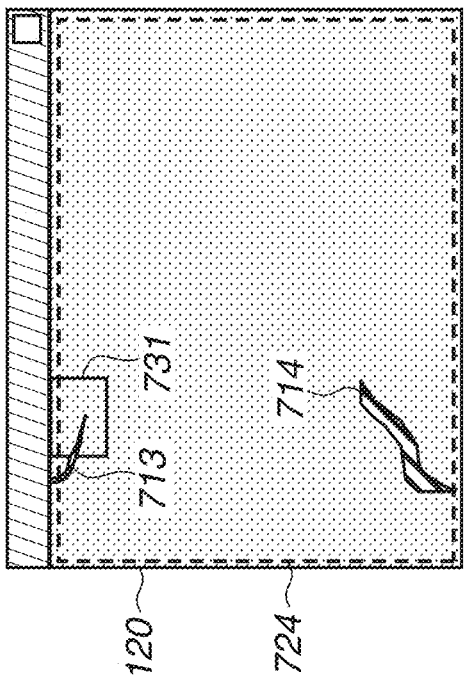

FIG. 7C is a diagram illustrating a state where the display image is displayed in the window 120 based on the stored display condition. In the example of FIG. 7C, the attention area is an area 724 indicated by a dotted line, and defects 713 and 714 exist in the area 724. Here, in order to check the defect 713 in detail, it is assumed that the user instructs the information processing apparatus 100 to enlarge a range 731 in FIG. 7C. A display image which the information processing apparatus 100 displays in the window 120 according to the instruction is illustrated in FIG. 7D. The attention area in the example of FIG. 7D is an area 725 indicated by a dotted line. An area 726 of the area 725, surrounded by a solid line, is a part of the area 724 in FIG. 7C. In a case where the state in FIG. 7C is shifted to the state in FIG. 7D, the candidate display condition is a display condition acquired from the display image in FIG. 7D. In this case, the information processing apparatus 100 may use an index defined by the following formulas 3 and 4 as the content variation C.

$$C = \beta^{\frac{S_1}{S \wedge S_1} \times \frac{d}{d_1}} \quad (S \wedge S_1 \neq 0, d \leq d_1) \quad \text{Formula 3}$$

$$C = \alpha \quad (S \wedge S_1 = 0) \quad \text{Formula 4}$$

Similar to the formula 1, a symbol "$S_1$" in the formula 3 represents the attention area in the display image displayed in the window 120 based on the stored display condition, i.e., the area 724 in the examples in FIGS. 7C and 7D. A symbol "$d_1$" represents a display magnification indicated by the stored display condition. Similar to the formula 1, a symbol "S" represents the attention area in the display image displayed in the window 120 based on the candidate display condition, i.e., the area 725 in the examples in FIGS. 7C and 7D. A symbol "d" represents a display magnification indicated by the candidate display condition.

A symbol "β" represents an optional constant number greater than 1. As illustrated in the formula 4, the content variation C is the constant number α when "$S^{\wedge}S_1$" is 0 (i.e., when display contents do not have an overlapping area).

In a case where the image is displayed in a reduced state ($d > d_1$), it is not necessary to consider much about the display magnification. Therefore, in order to correspond to the above-described case, the information processing apparatus 100 may use an index defined by the following formula 5 as the content variation C.

$$C = \beta^{\frac{S_1}{S \wedge S_1}} \quad (S \wedge S_1 \neq 0, d > d_1) \quad \text{Formula 5}$$

The content variation has been described as the above.

The present exemplary embodiment will be described by returning to FIG. 5.

In the present exemplary embodiment, the determination unit 105 uses the content variation C defined by the formulas 1 and 2. In S504, the determination unit 105 specifies an attention area indicated by the display image displayed in the window 120 based on the stored display condition, as the attention area $S_1$, and specifies an attention area indicated by the display image displayed in the window 120 based on the candidate display condition, as the attention area S. Then, the determination unit 105 acquires the content variation C through the formulas 1 and 2 based on the specified attention areas S and $S_1$ and the predetermined constant number α.

Further, as the stored display condition, the determination unit 105 selects one or more display conditions (n-pieces of display conditions, where "n" is an integer of one or greater). Then, the determination unit 105 acquires the content variation C with respect to each of n-pieces of selected stored display conditions. Through the above processing, the determination unit 105 acquires n-pieces of content variations C. These n-pieces of content variations C are collectively specified as "CN" (CN=(C1, C2, . . . , Cn)). Then, the determination unit 105 acquires the "CN" as a determination index. The processing in S504 is an example of index acquisition processing.

In the present exemplary embodiment, the determination unit 105 uses the content variation C defined by the formulas 1 and 2. However, as another example, the determination unit 105 may use the content variation C defined by another definition. For example, the determination unit 105 may use the content variation C defined by the formulas 3 and 4. In this case, the determination unit 105 acquires the content variation C through the formulas 3 and 4 based on the specified attention areas S and $S_1$, the display magnification d indicated by the candidate display condition, the display magnification $d_1$ indicated by the stored display condition, and the predetermined constant numbers α and β. Further, the determination unit 105 may also use the content variation C defined by the formula 5. In this case, the determination unit 105 acquires the content variation C through the formula 5 based on the specified attention areas S and $S_1$ and the predetermined constant number β.

In S505, based on the determination index CN acquired in S504, the determination unit 105 determines whether to store the candidate display condition. In the present exemplary embodiment, if all of the elements (C1 to Cn) of the determination index CN is a threshold value or more, the determination unit 105 determines to store the candidate display condition (YES in S505), and the processing proceeds to S506. For example, this threshold value should be an appropriate value that is acquired through experimentation.

Further, if an element having a value less than the predetermined threshold value is included in the elements C1 to Cn of the determination index CN, the determination unit 105 determines not to store the candidate display condition (NO in S505), so that the processing proceeds to S508.

In the present exemplary embodiment, the determination unit 105 determines to store the candidate display condition if all of the elements C1 to Cn of the determination index CN are the predetermined threshold value or more. However, as another example, the determination unit 105 may determine to store the candidate display condition if the number of elements from among the elements C1 to Cn of the determination index CN, having the predetermined threshold value or more is a predetermined number or more.

In S506, the display condition management unit 106 stores the candidate display condition acquired in S503 in the auxiliary storage device 153. The processing in S506 is an example of storage control processing.

In S507, the display data generation unit 103 updates the list 130 generated in S502, and displays the updated list 130 on the display unit 155. More specifically, the display data generation unit 103 updates the list 130 by adding the object corresponding to the candidate display condition stored in S506 to the list 130. The processing in S507 is an example of display control processing.

Figures 8A, 8B:
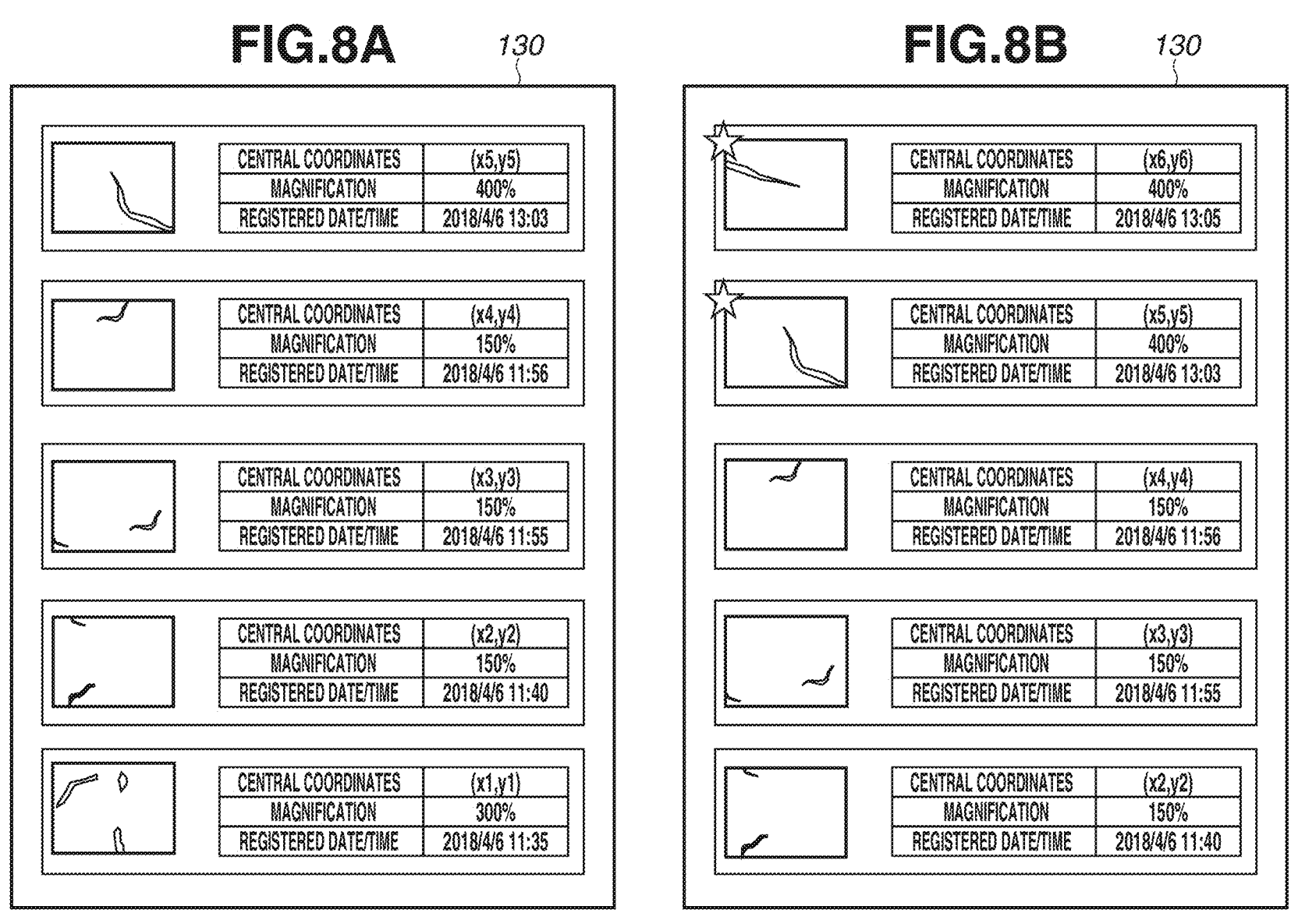

An example of update processing of the list 130 will be described with reference to FIGS. 8A and 8B. The list 130 in FIG. 8A is an example of the pre-updated list 130. The list 130 in FIG. 8B is the list 130 updated from the list 130 in FIG. 8A.

In the present exemplary embodiment, the display data generation unit 103 arranges the objects corresponding to the respective display conditions in the list 130 in the order of the latest stored date/time from the top. After the candidate display condition is stored in S506, the display data generation unit 103 generates an object used for providing an instruction for returning a display state based on the candidate display condition, and arranges the object on top of the list 130. Then, the display data generation unit 103 deletes the undermost object from among the objects in the pre-updated list 130, and arranges the rest of objects under the newly-arranged object. As a result, the list 130 is updated as illustrated in FIG. 8B.

In the present exemplary embodiment, as illustrated in FIGS. 8A and 8B, the display data generation unit 103 arranges five objects respectively corresponding to five display conditions in the list 130. However, as another example, the display data generation unit 103 may arrange four objects or less which respectively correspond to four display conditions or less in the list 130, or may arrange six objects or more which respectively correspond to six display conditions or more.

In order to indicate that the object corresponds to the display condition stored most recently, the display data generation unit 103 may execute the following processing. In other words, with respect to the objects displayed in the list 130, the display data generation unit 103 may superimpose marks on the objects corresponding to a predetermined number of recently-stored display conditions, or may change a display color thereof, in order to make these objects be visually recognizable by the user.

In the present exemplary embodiment, the display data generation unit 103 executes the processing in S507 at a timing when the processing in S506 is completed. However, as another example, the display data generation unit 103 may execute the processing in S507 at a different timing. Further, the display data generation unit 103 may execute the processing in S507 at a different timing in addition to the timing when the processing in S506 is completed.

For example, the display data generation unit 103 may execute the processing in S507 at a timing when the user starts operating the operation unit 154 to change the display condition of the display image in the window 120 after the processing in S506 is completed. This is because execution of the processing for storing the display condition immediately before can be assumed when the user starts changing the display condition. Further, for example, the display data generation unit 103 may execute the processing in S507 when a predetermined time has passed after the processing in S506 is completed.

In S508, if the display data generation unit 103 receives an instruction for ending the viewing operation of the target data through a user operation performed on the operation unit 154 (YES in S508), the processing in FIG. 5 ends. Further, if the display data generation unit 103 does not receive the instruction for ending the viewing operation of the target data (NO in S508), the processing proceeds to S509.

In S509, if the display condition acquisition unit 104 receives an instruction for changing the display condition through a user operation performed on the operation unit 154, the display condition acquisition unit 104 updates the display image displayed in the window 120 based on the display condition according to the instruction, and advances the processing to S503.

As described above, through the processing according to the present exemplary embodiment, the information processing apparatus 100 can store a display condition corresponding to a display state as a return candidate without receiving a user instruction for storing the display condition corresponding to the display state as the desired return destination. Accordingly, the information processing apparatus 100 can reduce a burden of the user.

Further, even in a case where the screen to which the user would like to return cannot be previously determined, the information processing apparatus 100 can store the display condition corresponding to the display state as a candidate of the return destination.

Variation Example 1 of First Exemplary Embodiment

In a variation example 1, the information processing apparatus 100 acquires the determination index based on the variation of the display condition. A hardware configuration and a functional configuration of the information processing apparatus 100 of the variation example 1 are similar to those of the first exemplary embodiment. The processing in the variation example 1 is different from the processing in the first exemplary embodiment in the processing in S504 and S505 in FIG. 5. Hereinafter, the processing in the variation example 1 different from the processing of the first exemplary embodiment will be described.

In S504, the determination unit 105 acquires a determination index based on a variation of the display condition (hereinafter, called as "condition variation") corresponding to the display image displayed in the window 120. The condition variation is an index which indicates a degree of change in a candidate display condition with respect to the stored display condition.

In the variation example 1, the determination unit 105 uses the below-described index as the condition variation. The condition variation is expressed as "D". In the variation example 1, the condition variation D is an index defined by the following formulas 6 and 7.

$$D = \gamma^{\sqrt{(x-x_1)^2+(y-y_1)^2} \times \frac{d_1}{d}} \quad (d \le d_1) \qquad \text{Formula 6}$$

$$D = \gamma^{\sqrt{(x-x_1)^2+(y-y_1)^2} \times \frac{d}{d_1}} \quad (d > d_1) \qquad \text{Formula 7}$$

In the Formulas 6 and 7, "(x, y)" represents central coordinates indicated by a candidate display condition, whereas "$(x_1, y_1)$" represents central coordinates indicated by a stored display condition. Further, a symbol "d" represents a display magnification indicated by the candidate display condition, whereas a symbol "$d_1$" represents a display magnification indicated by the stored display condition. Furthermore, a symbol "γ" represents a predetermined optional value greater than 1. In each of the formulas 6 and 7, a value of the condition variation D becomes greater when the variations of the central coordinates and the display magnifications are increased.

In the variation example 1, the condition variation D is an index defined by the formulas 6 and 7. However, the condition variation D can be another index as long as the index is defined using optional information about the display condition.

The determination unit 105 specifies the central coordinates and the display magnification indicated by the candidate display condition as "(x, y)" and "d" respectively, and specifies the central coordinates and the display magnification indicated by the stored display condition as "$(x_1, y_1)$" and "$d_1$" respectively. Then, the determination unit 105 acquires the condition variation D through the formulas 6 and 7 based on the specified "(x, y)", "d", "$(x_1, y_1)$" and "$d_1$", and the predetermined "γ". The determination unit 105 acquires the condition variation D with respect to each of n-pieces of selected stored display conditions. In this way, the determination unit 105 acquires n-pieces of condition variations D. These n-pieces of condition variations D are collectively expressed as "DN"=(D1, D2, . . . , Dn). Then, the determination unit 105 acquires the "DN" as a determination index.

In S505, based on the determination index DN acquired in S504, the determination unit 105 determines whether to store the candidate display condition. In the variation example 1, if all of the elements D1 to Dn of the determination index DN are a predetermined threshold value or more, the determination unit 105 determines to store the candidate display condition (YES in S505), and the processing proceeds to S506. For example, this threshold value should be an appropriate value that is acquired through experimentation. Further, if an element having a value less than the predetermined threshold value is included in the elements D1 to Dn of the determination index DN, the determination unit 105 determines not to store the candidate display condition (NO in S505), so that the processing proceeds to S508.

In the variation example 1, the determination unit 105 determines to store the candidate display condition if all of the elements D1 to Dn of the determination index DN are the predetermined threshold value or more. However, as another example, the determination unit 105 may determine to store the candidate display condition if the number of elements from among the elements D1 to Dn of the determination index DN, having the predetermined threshold value or more is a predetermined number or more.

As described above, through the processing in the variation example 1, the information processing apparatus 100 can achieve an effect similar to the effect achieved in the first exemplary embodiment.

Variation Example 2 of First Exemplary Embodiment

In a variation example 2, the exemplary embodiment will be described with respect to the case where the target data is time-series data, such as moving image data. In the variation example 2, the display condition includes information about an image capturing time which indicates a time of a frame in the moving image data. A hardware configuration and a functional configuration of the information processing apparatus 100 of the variation example 2 are similar to those of the first exemplary embodiment. In the variation example 2, the information processing apparatus 100 acquires the determination index based on a luminance value and an image capturing time.

An overview of the processing according to the variation example 2 will be described with reference to FIGS. 9A and 9B.

When the target data is a moving image, the user checks the target data while changing the frame (image capturing time). In the variation example 2, the target data is assumed to be moving image data acquired by a network camera. FIG. 9A illustrates a state where a display image of a moving image frame which images an interior of a room is displayed on the display unit 155. In the example in FIG. 9A, the attention area is an area 911 indicated by a dotted line.

In the viewing operation of a moving image, even if a display coordinate or a display magnification is fixed, display contents of a display image may be changed because of temporal change of an imaging target or an external factor, such as weather, if the image capturing time is changed.

Figure 9A:
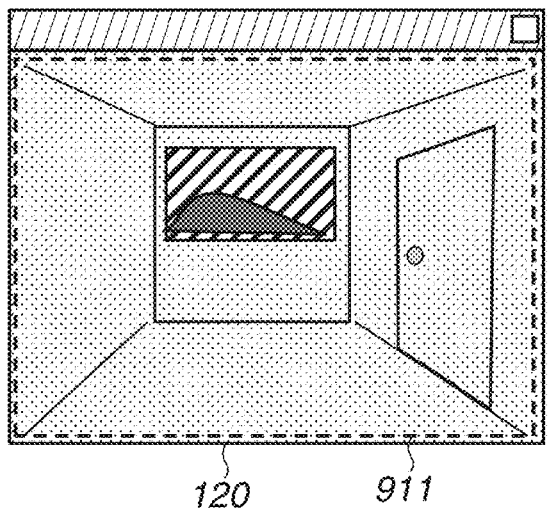
FIGS. 9A and 9B are diagrams illustrating examples of a viewing state.
Figure 9B:
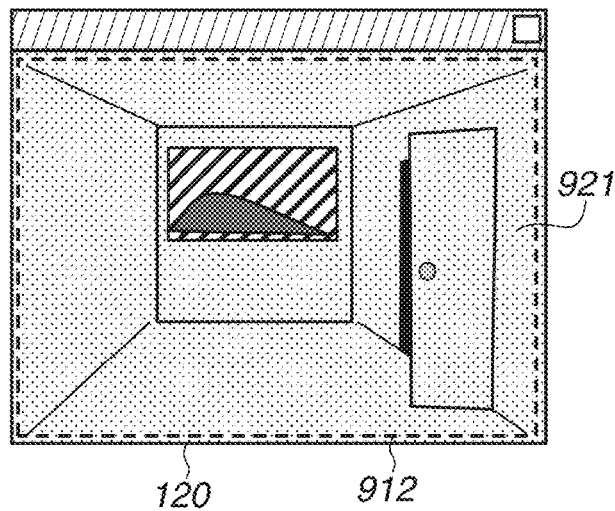

It is assumed that only a display condition of the image capturing time is changed from the state in FIG. 9A. This changed state is illustrated in FIG. 9B. The display image in FIG. 9B is an image of the same place captured when a predetermined time has passed from the image capturing time of the display image in FIG. 9A. The attention area in FIG. 9B is an area 912 indicated by a dotted line.

A display range is fixed between the areas 911 and 912, and there is only a small change in display contents thereof. More specifically, there is only a change in a door 921 that is open in FIG. 9B. In the variation example 2, in order to detect the above-described change, the information processing apparatus 100 uses a luminance value of the attention area. The information processing apparatus 100 further uses the information about an image capturing time of the display image. More specifically, in the variation example 2, the information processing apparatus 100 acquires a determination index by using the content variation C defined by the following formula 8.

$$C = \sum_p |I_{1p} - I_p| \times \gamma^{|t_1 - t|} \qquad \text{Formula 8}$$

A symbol "$t_1$" in the formula 8 represents an image capturing time indicated by the stored display condition. A symbol "t" represents an image capturing time indicated by the candidate display condition. A symbol "γ" represents a predetermined optional constant number greater than 1. A symbol "p" represents an index for identifying a pixel of the display image. A symbol "$I_{1p}$" represents each pixel value of the display image displayed in the window 120 based on the stored display condition. A symbol "Ip" represents each pixel value of the display image displayed in the window 120 based on the candidate display condition. By using the content variation C acquired by the formula 8, the information processing apparatus 100 can acquire the index of variations in the display contents in which a time variation is taken into consideration.

Details of the processing according to the variation example 2 will be described.

The processing in the variation example 2 is different from that of the first exemplary embodiment in that moving image data is specified as the target data, and also different in the processing in S504 in FIG. 5. Hereinafter, the processing in the variation example 2 different from the processing in the first exemplary embodiment will be described.

In S504, the determination unit 105 specifies a luminance value of each pixel in the display image displayed based on the stored display condition, as "$I_{1p}$". Then, the determination unit 105 specifies a luminance value of each pixel in the display image displayed based on the candidate display condition as "$I_p$". Further, the determination unit 105 specifies an image capturing time indicated by the stored display condition as "$t_1$". Then, the determination unit 105 specifies an image capturing time indicated by the candidate display condition as "t". The determination unit 105 acquires the content variation C through the formula 8 based on the specified luminance values $I_{1p}$ and $I_p$, the specified image capturing times $t_1$ and t, and the predetermined constant number γ.

The determination unit 105 acquires the content variation C with respect to each of the n-pieces of selected stored display conditions. Through the above processing, the determination unit 105 acquires n-pieces of content variations C. These n-pieces of content variations C are collectively expressed as "CN" (CN=(C1, C2, . . . , Cn)). Then, the determination unit 105 acquires the "CN" as a determination index.

In the variation example 2, the information processing apparatus 100 acquires the determination index based on the content variation. However, as another example, the information processing apparatus 100 may acquire the determination index based on the condition variation as described in the variation example 1. Further, the information processing apparatus 100 may acquire the determination index based on the condition variation and the image capturing time indicated by the display condition.

Through the processing in the variation example 2, the information processing apparatus 100 can store the display condition corresponding to the display state as a return candidate without receiving a user instruction even in a case where the target data is the time-series data.

Variation Example 3 of First Exemplary Embodiment

There is a case where the display contents or the display condition should be fixed when the user carefully checks a part of the target data. For example, in an appearance inspection using an image of a component or an outer package of a product, the user checks the image while holding or gradually changing the display condition to display an image of an attention area in order to check a defective pattern, such as a fine scratch or a flaw, having a luminance change. At this time, there is a case where the content variation or the display condition variation becomes minimal because change of display contents or display conditions is minimal. Therefore, there is a possibility that it is difficult to determine whether to store the display condition based on the content variation or the display condition variation.

Therefore, the information processing apparatus 100 of the variation example 3 acquires a gazing degree as an index which indicates how long the user is gazing at the display image, and acquires a determination index based on the gazing degree. With this configuration, the information processing apparatus 100 can determine whether to store the display condition corresponding to the display state based on whether the user is gazing at the screen.

A hardware configuration of the information processing apparatus 100 of the variation example 3 is similar to that of the first exemplary embodiment.

Further, in the variation example 3, the information processing apparatus 100 is connected to an external image-capturing apparatus (hereinafter, "connected image-capturing apparatus") via a network I/F 156. In the variation example 3, the connected image-capturing apparatus is an infrared camera having an infrared sensor. The connected image-capturing apparatus is arranged at a position where the user's face can be imaged, and images a face of the user who is viewing the target data while emitting infrared light. The information processing apparatus 100 acquires an image captured by the connected image-capturing apparatus from the connected image-capturing apparatus.

FIG. 10 is a block diagram illustrating an example of a functional configuration of the information processing apparatus 100 of the variation example 3. The functional configuration of the information processing apparatus 100 of the variation example 3 is different from the functional configuration in FIG. 3B in that the functional configuration includes a gazing information detection unit 1001 and a gazing information management unit 1002.

Further, the determination unit 105 of the variation example 3 acquires a position of a gazing point of the user (hereinafter, called as "point-of-gaze position") managed by the gazing information management unit 1002, and analyzes a gazing state of the user based on the acquired point-of-gaze position. A gazing point refers to a point which the user is gazing at.

The gazing information detection unit 1001 uses a publicly-known method to detect positions of the user's eyes and a user's line-of-sight from the moving image transmitted from the connected image-capturing apparatus, and acquires the point-of-gaze position based on the detected positions of the eyes and the detected line-of-sight.

The following method can be given as an example of a publicly known method for detecting the positions of the user's eyes and the user's line-of-sight. In the method, an edge detection method, such as the canny edge detection method, is applied to each of the frames in the captured moving image of the user's face, and the eyes and the pupils are detected through pattern matching using the detected edge information. Subsequently, corneal reflection light (Purkinje's figure) in the vicinity of the pupil is detected by using luminance information of the moving image. Thereafter, line-of-sight information is calculated through a corneal reflection method based on a positional relationship between the pupil and the Purkinje's figure.

For example, the following method can be used as an acquisition method of the point-of-gaze position. In the method, a moving image of the face of the user is captured while the user is asked to gaze at a specific position of the data, a correspondence relationship among a coordinate position, the line-of-sight, and a gazing point of the eyes is acquired from a frame of the captured moving image through prior calibration, and the acquired correspondence relationship is used.

The gazing information management unit 1002 stores the point-of-gaze position acquired by the gazing information detection unit 1001 in the auxiliary storage device 153, and manages the stored point-of-gaze position.

FIG. 11 is a flowchart illustrating an example of processing executed by the information processing apparatus 100 of the variation example 3. The processing in FIG. 11 is different from the processing in FIG. 5 in that the processing in S510 to S511 is executed instead of processing in S504 to S505. The respective pieces of processing in S501 to S503 and S506 to S509 are similar to those described in FIG. 5. The processing in FIG. 11 different from the processing in FIG. 5 will be described.

In S510, the determination unit 105 acquires the gazing point information managed by the gazing information management unit 1002 and acquires shifting information indicating a shifting state of the point-of-gaze position. The shifting state refers to information indicating how the point-of-gaze position is shifted according to passage of time. Then, based on the acquired shifting information, the determination unit 105 specifies a period when the user's gazing point is brought into a stationary state in the display image. The stationary state refers to a state where the gazing point continuously exists at a position included within a predetermined range for a certain period or longer. The determination unit 105 acquires the specified period as a determination index.

An example of the user's point-of-gaze position brought into a stationary state will be described with reference to FIG. 12.

Figure 12:
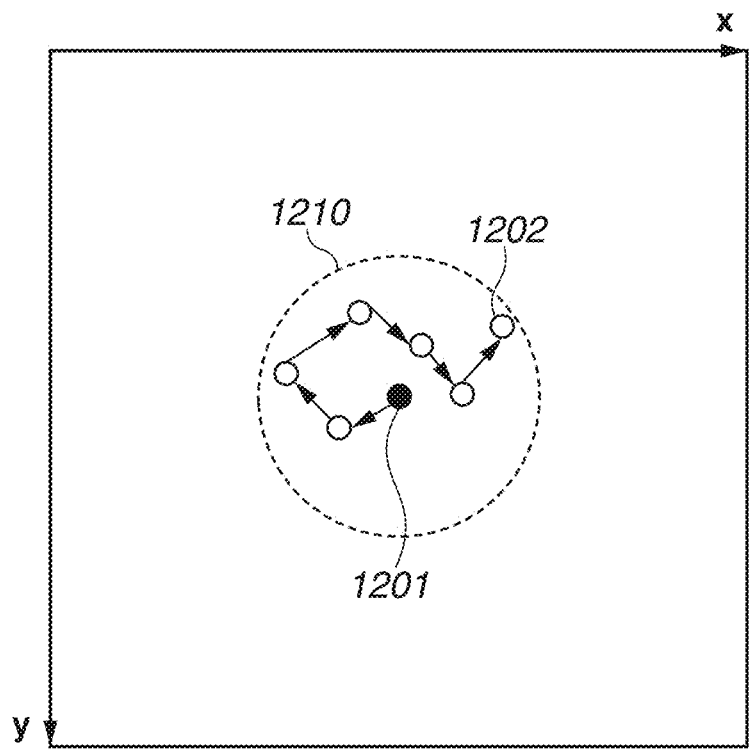
FIG. 12 is a diagram illustrating an example of a method of determining a gazing state.

FIG. 12 is a plot illustrating gazing points acquired by the gazing information detection unit 1001 within a certain period, plotted on two-dimensional coordinates. A gazing point 1201 is a user's gazing point at the beginning of the certain period. With the passage of time, the user's gazing point is moved in a direction indicated by an arrow. A gazing point 1202 is a user's gazing point when the certain time has passed. The user's gazing point tends to be stationary when the user is viewing data which the user is highly interested in. In the variation example 3, the information processing apparatus 100 acquires a period when the user's gazing point is staying within a certain range (a range 1210, in the example of FIG. 12) in a display image displayed on the display unit 155, as a determination index by using the above-described characteristic. Then, the information processing apparatus 100 determines whether the user is gazing at a certain position in the target data depending on whether the acquired determination index is a threshold value or more.

In S511, if the determination index acquired in S510 is a predetermined threshold value or more, the determination unit 105 determines that the user is gazing at a position on the display image and stores the display condition corresponding to that display image (YES in S511). Then, the processing proceeds to S506. If the determination index acquired in S510 is less than the predetermined threshold value, the determination unit 105 determines that the user is not gazing at a position on the display image, and does not store the display condition corresponding to the display image (NO in S511). Then, the processing proceeds to S508.

In the variation example 3, if a period when the user is gazing at a display image becomes longer, there is a possibility that the same display condition or a remarkably similar display condition is repeatedly stored. Therefore, it is preferable that the information processing apparatus 100 executes processing to prevent a useless display condition from being stored. For example, the information processing apparatus 100 may stand ready for a certain period after completion of the processing in S511. In this way, the information processing apparatus 100 can prevent a useless display condition from being stored.

As described above, through the processing described in the variation example 3, the information processing apparatus 100 can store the display condition on which the user places great importance by storing the display condition corresponding to the display state of the display image which the user has actually gazed at.

Variation Example 4 of First Exemplary Embodiment

In a case where an operation for changing a display condition, e.g., an enlargement/reduction operation or a coordinate moving operation, is repeatedly executed while the user is viewing the target data including a lot of similar patterns, the user is likely to be confused about to what extent the target data is viewed. For example, when an image of a wall face of a concrete structural object is inspected, the user enlarges and displays a part of the image to check defects, such as cracks unevenly existing on the concrete wall face. The user comprehensively executes the above checking operation across the entire target data while changing the display range. However, because the concrete wall face includes a lot of similar patterns, the user is likely to be confused about to what extent the target data has been viewed if the operation for changing the display condition, such as an enlargement/reduction operation or a coordinate moving operation, is repeatedly executed.

In the variation example 4, the information processing apparatus 100 executes processing for supporting the operation for the above-described purpose.

A hardware configuration and a functional configuration of the information processing apparatus 100 of the variation example 4 are similar to those of the first exemplary embodiment.

An example of the processing according to the variation example 4 will be described with reference to FIGS. 13A, 13B, 13C, 13D, and 13E. An image 1310 of a concrete wall face illustrated in FIG. 13A is one example of the target data according to the variation example 4.

The display data generation unit 103 divides the target data into sections having a certain size. Each section has a predetermined easily-viewable size, such as a size of 800× 600 pixels.

Figure 13A:
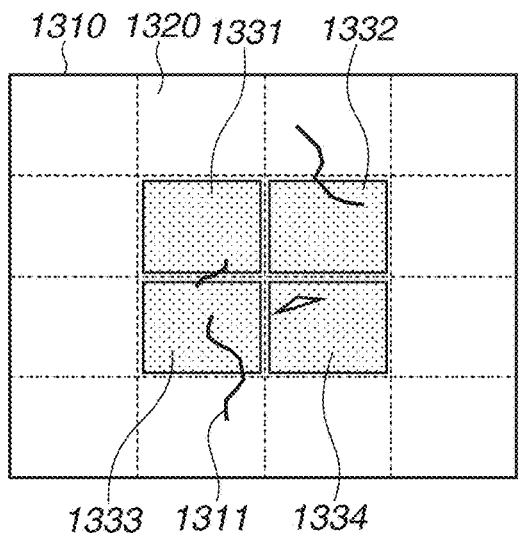
FIGS. 13A, 13B, 13C, 13D, and 13E are diagrams illustrating an example of processing executed by the information processing apparatus.

FIG. 13A illustrates the image 1310 as target data and a grid 1320 that divides the image 1310. Four divided areas at a central portion of the image 1310 are specified as respective areas 1331, 1332, 1333, and 1334.

Figure 13B:
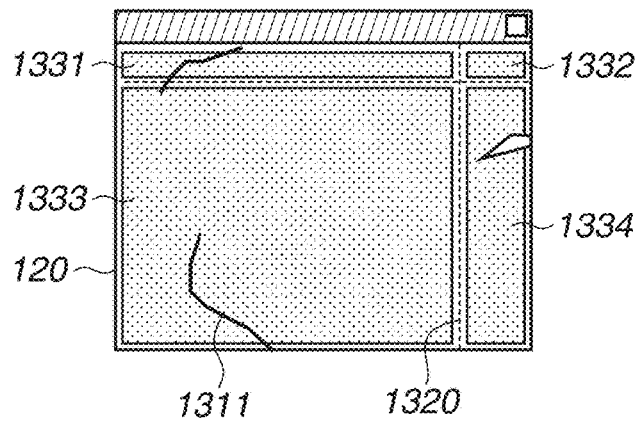

The display data generation unit 103 displays a display image of the image 1310 as the target data in the window 120. FIG. 13B illustrates a state where the central portion of the image 1310 is displayed in the window 120. In the example of FIG. 13B, the areas 1331, 1332, 1333, 1334, and the grid 1320 are partially displayed in the window 120.

Based on the display contents of the window 120, the information processing apparatus 100 selects any one of the areas 1331, 1332, 1333, and 1334. For example, the information processing apparatus 100 selects an area of the largest display size. In the example of FIG. 13B, the area 1333 is selected.

Figure 13C:
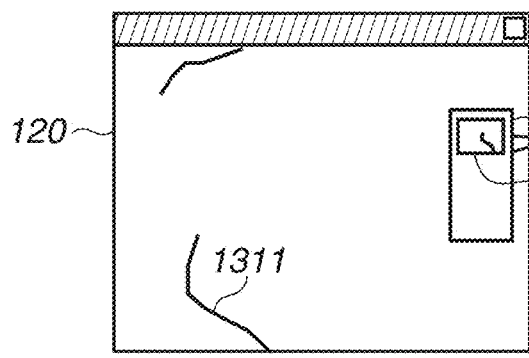
Figure 13D:
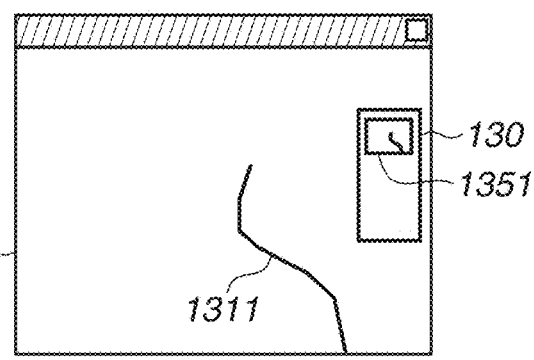

Thereafter, the information processing apparatus 100 executes processing for acquiring a display condition corresponding to a display state as a candidate of a return destination from the selected area 1333 and storing the acquired display condition. In FIG. 13C, the list 130 includes an object 1351 used for providing an instruction for returning a display state to a display of the area 1333. In this case, if the object 1351 is selected, the information processing apparatus 100 displays a display image illustrating the area 1333 on the display unit 155 by using the display condition corresponding to the object 1351.

Figure 13E:
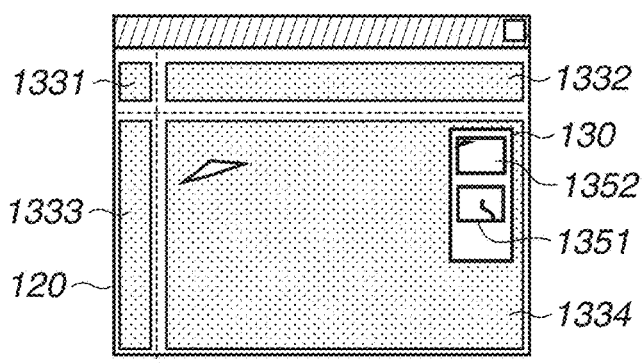

Subsequently, processing to be executed when the attention area is changed by the operation for changing the display condition will be described. It is assumed that the attention area is moved in parallel from a state illustrated in FIG. 13C. FIG. 13E illustrates a state where the attention area is moved to the right from the state illustrated in FIG. 13C. In the example in FIG. 13E, the areas 1331, 1332, 1333, 1334, and the grid 1320 are partially displayed in the window 120. At this time, the information processing apparatus 100 selects the area 1334 having the largest display size. The information processing apparatus 100 acquires a display condition corresponding to a display state as a candidate of a return destination from the selected area 1334 and stores the acquired display condition. Then, the information processing apparatus 100 displays an object 1352 used for providing an instruction for returning to a display state of the area 1334 on the list 130. FIG. 13E illustrates a state where the object 1352 is included in the list 130.

The processing according to the variation example 4 will be described in detail. The processing in the variation example 4 is different from that of the first exemplary embodiment in that the target data is image data in which similar patterns frequently appear, and also different in the processing in S503 to S506 in FIG. 5. Hereinafter, the processing in the variation example 4 different from the processing in the first exemplary embodiment will be described.

In S503, based on the display image displayed on the display unit 155, the display condition acquisition unit 104 specifies one or more areas included in this display image from among a plurality of areas previously set as the target data. Then, with respect to the one or more specified areas, the display condition acquisition unit 104 specifies display conditions for displaying these respective areas. The display condition acquisition unit 104 acquires the one or more specified display conditions as the respective candidate display conditions corresponding to the display image.

In S504, with respect to the one or more candidate display conditions acquired in S503, the determination unit 105 specifies sizes of the areas corresponding to the display conditions included in the display image displayed on the display unit 155. The determination unit 105 acquires one or more sizes specified with respect to the one or more display conditions as determination indexes of the one or more display conditions.

In S505, the determination unit 105 specifies the maximum determination index from among the one or more determination indexes specified in S504, and determines to store the candidate display condition corresponding to the specified determination index. However, as another example, the determination unit 105 may specify two or more maximum determination indexes of a predetermined number from among the one or more determination indexes specified in S504, and may determine to store the candidate display conditions corresponding to the respective specified determination indexes. Then, the determination unit 105 advances the processing to S506.

In S506, the display condition management unit 106 stores the candidate display conditions determined to be stored in S505 in the auxiliary storage device 153. Through the above-described processing, the information processing apparatus 100 can display the objects corresponding to the display conditions stored in S506 in the list 130.

As described above, the information processing apparatus 100 stores the display condition for displaying the area that occupies a main portion of the display image viewed by the user. The object corresponding to the display condition for displaying the area is displayed on the list 130. With this configuration, the information processing apparatus 100 can reproduce a display of the area close to the attention area viewed by the user according to selection of the object stored in the list 130.

In a case where the user checks a long crack extending over a plurality of areas, the user changes the attention areas one after another. Therefore, there is a possibility that an object corresponding to a screen position to which the user would like to return may not be easily found in the list 130. In order to cope with the above situation, the information processing apparatus 100 may control the processing for storing the display condition depending on the contents of the user operation. For example, the information processing apparatus 100 does not store the display condition in a case where the attention area is moved in parallel while being enlarged and displayed at a certain magnification or greater. In this way, the contents of the list 130 will not be updated when the user is enlarging and checking the crack in detail. The information processing apparatus 100 directly displays the object stored before the user enlarges the display, so that the screen can be easily returned to a display state to which the user would like to return.

As described above, through the processing according to the variation example 4, even in a case where similar patterns frequently appear in the target data, the information processing apparatus 100 can store the appropriate display condition and provide the user with objects corresponding to the stored display conditions by displaying the objects in the list 130. Through the above-described configuration, the user can return to a specific display screen regardless of the number of similar patterns existing in the target data, so that the user is less likely to be confused about to what extent the target data has been viewed.

Variation Example 5 of First Exemplary Embodiment

In a variation example 5, the exemplary embodiment will be described with respect to the case where the target data is three-dimensional data.

In a case where the target data is three-dimensional data, the user executes the viewing operation of the target data while changing three-dimensional coordinates. In the variation example 5, it is assumed that the target data is three-dimensional data acquired by a medical diagnosis apparatus, such as a computed tomography (CT) scanning apparatus used for medical image diagnosis.

The processing in the variation example 5 is different from that of the first exemplary embodiment in that target data is three-dimensional data, and also different in the processing in S504. The processing different from that of the first exemplary embodiment will be described.

An overview of the processing according to the variation example 5 will be described with reference to FIGS. 14A, 14B, and 14C.

Figure 14A:
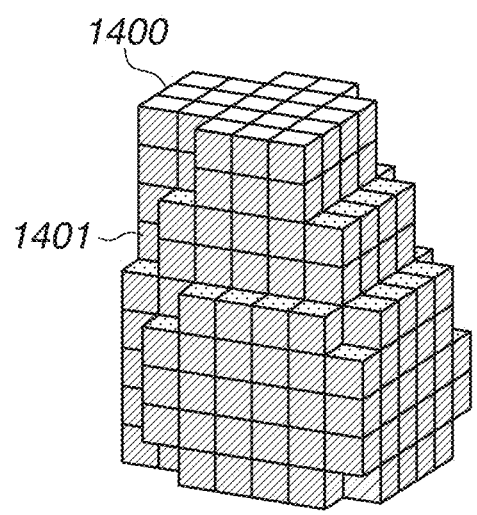
FIGS. 14A, 14B, and 14C are diagrams illustrating examples of a viewing state.

FIG. 14A is a diagram illustrating a state where a vessel area 1400 as a part of an area of three-dimensional data of a patient's vessel regarded as target data is cut out and displayed on the display unit 155 as voxel data.

A display state in FIG. 14A is a display state based on the stored display condition. In the examples illustrated in FIGS. 14A, 14B, and 14C, the attention area is an area of voxels 1401 on a surface thereof indicated by shaded lines from among the voxels expressing the vessel area 1400. In the viewing operation of three-dimensional data, the user views the three-dimensional data while changing the line-of-sight.

Figure 14B:
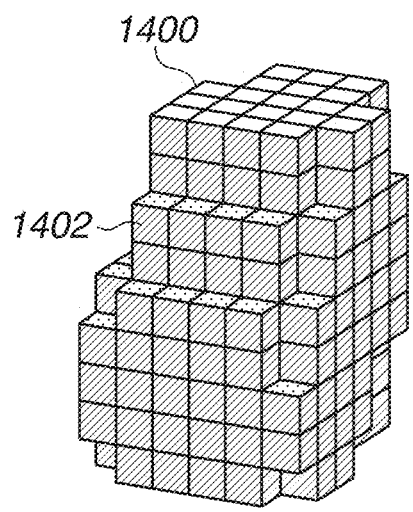
Figure 14C:
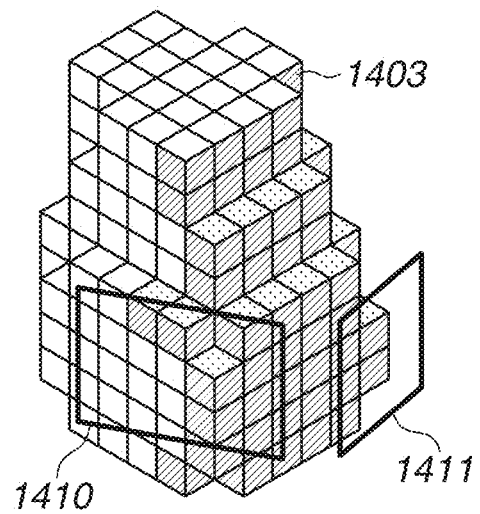

For example, FIG. 14B illustrates a state where the line-of-sight with respect to the target data is rotated by 90-degrees from the state illustrated in FIG. 14A. The attention area in FIG. 14B is an area corresponding to voxels 1402, which is different from the attention area in FIG. 14A. FIG. 14C is a diagram illustrating a state where the vessel area 1400 is displayed with another line-of-sight. Frames 1410 and 1411 in FIG. 14C respectively indicate viewpoints in FIGS. 14A and 14B. An overlapping portion between the voxels 1401 and 1402 is an area corresponding to voxels 1403 in FIG. 14C. Here, a display condition acquired from the display image in FIG. 14B is specified as a candidate display condition. The content variation C indicating an overlapping degree of the voxels 1401 and 1402 can be acquired by the formulas 1 and 2 by taking the voxels 1401 as "$S_1$" and the voxels 1402 as "S".

The processing in S504 of the variation example 5 will be described in detail.

The processing in S504 of the variation example 5 is different from that of the first exemplary embodiment in that the determination unit 105 uses the voxels of the target data included in the display image displayed based on the stored display condition as "$S_1$", and uses the voxels of the target data included in the display image displayed based on the candidate display condition as "S". The rest of processing is similar to the processing described in the first exemplary embodiment.

As described above, through the processing according to the variation example 5, the information processing apparatus 100 can store the display condition corresponding to the display state regarded as a return candidate without receiving a user instruction even in a case where the target data is three-dimensional data. Accordingly, the information processing apparatus 100 can reduce a burden of the user.

Other Exemplary Embodiments

The information processing apparatus 100 described in the first exemplary embodiment and its variation examples is effectively applied when a defect, such as a crack or a scratch, is to be checked or an interior of a room is to be monitored through a checking operation using a captured image of an inspection target object. However, for example, the information processing apparatus 100 can be also applied to an operation (appearance inspection) for checking defects, such as scratches, in a product image at a factory or an operation (medical diagnosis) for checking a lesion in a captured image of a body at a hospital.

Further, in the first exemplary embodiment and its variation examples, the information processing apparatus 100 stores the display condition corresponding to the display state regarded as a return candidate based on the information that can be acquired when a single user is viewing data. However, for example, the information processing apparatus 100 may store display states of screens viewed by many users when more than one users are viewing data. Further, in a case where an inexperienced user is viewing data, there is a risk in which the information processing apparatus 100 stores many display states of less important screens. In such a case, the information processing apparatus 100 may change storage determination processing of the display state depending on a skillset of the user.

For example, all or a part of the above-described functional configuration of the information processing apparatus 100 may be mounted thereon as the hardware. Although an exemplary embodiment has been described above, some embodiments are not limited to the specific exemplary embodiment. For example, the above-described exemplary embodiment and the variation examples may be optionally combined.

OTHER EMBODIMENTS

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2019-026581, which was filed on Feb. 18, 2019 and which is hereby incorporated by reference herein in its entirety.

What is claimed is:

1. An information processing apparatus comprising:
one or more processors and one or more memories cooperating to implement:
a condition acquisition unit configured to acquire a display condition for displaying at least a part of target data as a display image on a display device;

a determination unit configured to, in a case where the display image is changed, determine whether to store the display condition according to a changed display image in a storage device, based on an index relating to the change of the display image;

a storage control unit configured to, in a case where the determination unit determines to store the display condition, store the display condition according to the changed display image in the storage device; and a display control unit configured to display one or more objects corresponding to one or more display conditions stored in the storage device on the display device, wherein the one or more objects are used for specifying a display condition of a portion of the target data to be displayed on the display device.

2. The information processing apparatus according to claim 1, wherein the one or more processors and the one or more memories further cooperate to implement:

a generation unit configured to generate the display image according to the display condition from the target data, wherein the information processing apparatus causes the generation unit to generate the display image according to the display condition stored in the storage device to return a display state of the display device to a past display image.

3. The information processing apparatus according to claim 2, wherein, in a case where one display condition is specified by a user from among one or more display conditions stored in the storage device, the generation unit generates the display image according to the specified display condition.

4. The information processing apparatus according to claim 1, wherein the display control unit displays a portion of the target data according to a display condition corresponding to an object specified by a user from among the one or more objects as the display image on the display device.

5. The information processing apparatus according to claim 1, wherein the display control unit displays an image of a downward view of the target data on the display device together with the one or more objects.

6. The information processing apparatus according to claim 1, wherein, in a case where the display condition is changed by a user operation performed on the display image, the determination unit acquires the index based on a variation of contents in the display image.

7. The information processing apparatus according to claim 1, wherein, in a case where the display condition is changed by a user operation performed on the display image, the determination unit acquires the index based on the display image displayed on the display device according to the changed display condition acquired by the condition acquisition unit and the display image displayed on the display device according to a predetermined display condition.

8. The information processing apparatus according to claim 7, wherein the determination unit acquires the index based on a degree of overlap between the display image displayed on the display device according to the changed display condition and the display image displayed on the display device according to the predetermined display condition.

9. The information processing apparatus according to claim 7, wherein the determination unit acquires the index based on a luminance value of the display image displayed on the display device according to the changed display condition and a luminance value of the display image displayed on the display device according to the predetermined display condition.

10. The information processing apparatus according to claim 1, wherein the display condition includes information about a position of a portion of the target data displayed on the display device and information about a display magnification.

11. The information processing apparatus according to claim 1, wherein the target data is image data based on a captured image of a wall face of a concrete structural object.

12. The information processing apparatus according to claim 1, wherein the target data is three-dimensional data, and wherein, in a case where the display condition is changed by a user operation performed on the display image, the determination unit acquires the index based on a voxel included in the display image displayed on the display device according to the changed display condition acquired by the condition acquisition unit and a voxel included in the display image displayed on the display device according to a predetermined display condition.

13. The information processing apparatus according to claim 1, wherein the determination unit acquires the index based on a position of an attention area indicated by the display condition, a display magnification indicated by the display condition, a position of an attention area indicated by the different display condition, and a display magnification indicated by the different display condition.

14. The information processing apparatus according to claim 13, wherein the determination unit acquires the index based on a point-of-gaze position which a user viewing the display device is gazing at or a period when the gazing point is in a stationary state.

15. An information processing method executed by an information processing apparatus, the method comprising:

acquiring a display condition for displaying at least a part of target data as a display image on a display device;

in a case where the display image is changed, determining whether to store the display condition according to a changed display image in a storage device, based on an index relating to the change of the display image;

in a case where the determining determines to store the display condition, storing the display condition according to the changed display image in the storage device; and displaying one or more objects corresponding to one or more display conditions stored in the storage device on the display device, wherein the one or more objects are used for specifying a display condition of a portion of the target data to be displayed on the display device.

16. A non-transitory computer-readable recording medium storing a program that causes a computer to perform a method comprising:

acquiring a display condition for displaying at least a part of target data as a display image on a display device;

in a case where the display image is changed, determining whether to store the display condition according to a changed display image in a storage device, based on an index relating to the change of the display image;

in a case where the determination unit determines to store the display condition, storing the display condition according to the changed display image in the storage device; and displaying one or more objects corresponding to one or more display conditions stored in the storage device on the display device, wherein the one or more objects are used for specifying a display condition of a portion of the target data to be displayed on the display device.

17. An information processing apparatus comprising:

one or more processors and one or more memories cooperating to implement:

a condition acquisition unit configured to acquire a display condition for displaying at least a part of target data as a display image on a display device;

a determination unit configured to, in a case where the display image is changed, determine whether to store the display condition according to a changed display image in a storage device, based on an index relating to the change of the display image; and a storage control unit configured to, in a case where the determination unit determines to store the display condition, store the display condition according to the changed display image in the storage device, wherein, in a case where the target data is time-series data, the display condition includes a time, and wherein the determination unit acquires the index based on a luminance value of the display image displayed on the display device at a first time, a luminance value of an area of the target data displayed on the display device at a second time, and a difference between the first time and the second time.

18. The information processing apparatus according to claim 17, wherein the one or more processors and the one or more memories further cooperate to implement:

a generation unit configured to generate the display image according to the display condition from the target data, wherein the information processing apparatus causes the generation unit to generate the display image according to the display condition stored in the storage device to return a display state of the display device to a past display image.

19. The information processing apparatus according to claim 17, wherein, in a case where one display condition is specified by a user from among one or more display conditions stored in the storage device, the generation unit generates the display image according to the specified display condition.

20. The information processing apparatus according to claim 17, wherein the one or more processors and the one or more memories further cooperate to implement:

a display control unit configured to display one or more objects corresponding to one or more display conditions stored in the storage device on the display device, wherein the one or more objects are used for specifying a display condition of a portion of the target data to be displayed on the display device.

21. The information processing apparatus according to claim 20, wherein the display control unit displays a portion of the target data according to a display condition corresponding to an object specified by a user from among the one or more objects as the display image on the display device.

22. The information processing apparatus according to claim 20, wherein the display control unit displays an image of a downward view of the target data on the display device together with the one or more objects.

23. The information processing apparatus according to claim 17, wherein, in a case where the display condition is changed by a user operation performed on the display image, the determination unit acquires the index based on a variation of contents in the display image.

24. The information processing apparatus according to claim 17, wherein, in a case where the display condition is changed by a user operation performed on the display image, the determination unit acquires the index based on the display image displayed on the display device according to the changed display condition acquired by the condition acquisition unit and the display image displayed on the display device according to a predetermined display condition.

25. The information processing apparatus according to claim 24, wherein the determination unit acquires the index based on a degree of overlap between the display image displayed on the display device according to the changed display condition and the display image displayed on the display device according to the predetermined display condition.

26. The information processing apparatus according to claim 24, wherein the determination unit acquires the index based on a luminance value of the display image displayed on the display device according to the changed display condition and a luminance value of the display image displayed on the display device according to the predetermined display condition.

27. The information processing apparatus according to claim 17, wherein the display condition includes information about a position of a portion of the target data displayed on the display device and information about a display magnification.

28. The information processing apparatus according to claim 17, wherein the target data is image data based on a captured image of a wall face of a concrete structural object.

29. The information processing apparatus according to claim 17, wherein the target data is three-dimensional data, and wherein, in a case where the display condition is changed by a user operation performed on the display image, the determination unit acquires the index based on a voxel included in the display image displayed on the display device according to the changed display condition acquired by the condition acquisition unit and a voxel included in the display image displayed on the display device according to a predetermined display condition.

30. The information processing apparatus according to claim 17, wherein the determination unit acquires the index based on a position of an attention area indicated by the display condition, a display magnification indicated by the display condition, a position of an attention area indicated by the different display condition, and a display magnification indicated by the different display condition.

31. The information processing apparatus according to claim 30, wherein the determination unit acquires the index based on a point-of-gaze position which a user viewing the display device is gazing at or a period when the gazing point is in a stationary state.

32. An information processing method executed by an information processing apparatus, the method comprising:

acquiring a display condition for displaying at least a part of target data as a display image on a display device, wherein, in a case where the target data is time-series data, the display condition includes a time;

in a case where the display image is changed, determining whether to store the display condition according to a changed display image in a storage device, based on an index relating to the change of the display image, wherein the index is acquired based on a luminance value of the display image displayed on the display device at a first time, a luminance value of an area of the target data displayed on the display device at a second time, and a difference between the first time and the second time; and in a case where the determining determines to store the display condition, storing the display condition according to the changed display image in the storage device.

33. A non-transitory computer-readable recording medium storing a program that causes a computer to perform a method comprising:

acquiring a display condition for displaying at least a part of target data as a display image on a display device, wherein, in a case where the target data is time-series data, the display condition includes a time;

in a case where the display image is changed, determining whether to store the display condition according to a changed display image in a storage device, based on an index relating to the change of the display image, wherein the index is acquired based on a luminance value of the display image displayed on the display device at a first time, a luminance value of an area of the target data displayed on the display device at a second time, and a difference between the first time and the second time; and in a case where the determining determines to store the display condition, storing the display condition according to the changed display image in the storage device.

* * * * *